US012623870B2

(12) United States Patent
Yamasaki

(10) Patent No.: US 12,623,870 B2
(45) Date of Patent: May 12, 2026

(54) MEDIUM FEEDING DEVICE AND CONTROL METHOD FOR MEDIUM FEEDING DEVICE

(71) Applicant: SEIKO EPSON CORPORATION, Tokyo (JP)

(72) Inventor: Masaya Yamasaki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 19/021,848

(22) Filed: Jan. 15, 2025

(65) Prior Publication Data

US 2025/0230006 A1 Jul. 17, 2025

(30) Foreign Application Priority Data

Jan. 15, 2024 (JP) ................................. 2024-003783

(51) Int. Cl.
  *B65H 1/14* (2006.01)
  *B65H 3/06* (2006.01)
  *B65H 7/02* (2006.01)
  *H04N 1/12* (2006.01)
(52) U.S. Cl.
  CPC ............. *B65H 1/14* (2013.01); *B65H 3/0684* (2013.01); *B65H 7/02* (2013.01); *B65H 2301/42324* (2013.01); *B65H 2513/40* (2013.01); *B65H 2515/34* (2013.01); *B65H 2553/81* (2013.01); *B65H 2801/39* (2013.01); *H04N 1/1215* (2013.01); *H04N 2201/0081* (2013.01)

(58) Field of Classification Search
  CPC .............. B65H 1/08; B65H 1/10; B65H 1/12; B65H 1/14; B65H 1/16; B65H 1/18; B65H 1/20; B65H 1/22; B65H 1/225; B65H 1/24; B65H 3/0684
  See application file for complete search history.

(56) References Cited

U.S. PATENT DOCUMENTS 6,032,946 A * 3/2000 Marshall ................ B65H 1/025
                                                271/154
7,396,010 B2 * 7/2008 Naruoka .............. B65H 3/0653
                                                271/149
7,500,664 B2 * 3/2009 Nakashima .............. B65H 3/06
                                                271/157

FOREIGN PATENT DOCUMENTS

JP 2011-219256 A 11/2011

* cited by examiner

*Primary Examiner* — Jeremy R Severson
(74) *Attorney, Agent, or Firm* — WORKMAN NYDEGGER

(57) ABSTRACT

A medium feeding device includes a placement section on which a medium group is supported; a raising and lowering section configured to raise and lower the placement section; a pickup unit that includes a pickup roller that comes into contact with an upper section of the medium group and a support section that applies a downward force to the pickup roller, and that feeds a medium in order from a top in a feed direction while applying a downward pressing force to the medium group from the pickup roller; a control section; and a detection section configured to detect the pressing force, wherein the control section causes the raising and lowering section to raise and lower the placement section such that a detected pressing force falls within a target range.

11 Claims, 15 Drawing Sheets

3

UNIT SHEET NUMBER WEIGHT TABLE TA2

| MEDIUM TYPE | $\Delta W$ |
|---|---|
| PLAIN PAPER | $\Delta W1$ |
| THIN PAPER | $\Delta W2$ |
| THICK PAPER | $\Delta W3$ |
| PHOTO PAPER | $\Delta W4$ |

FIG. 8

AFTER SETTING NUMBER N OF SHEETS, START SCAN

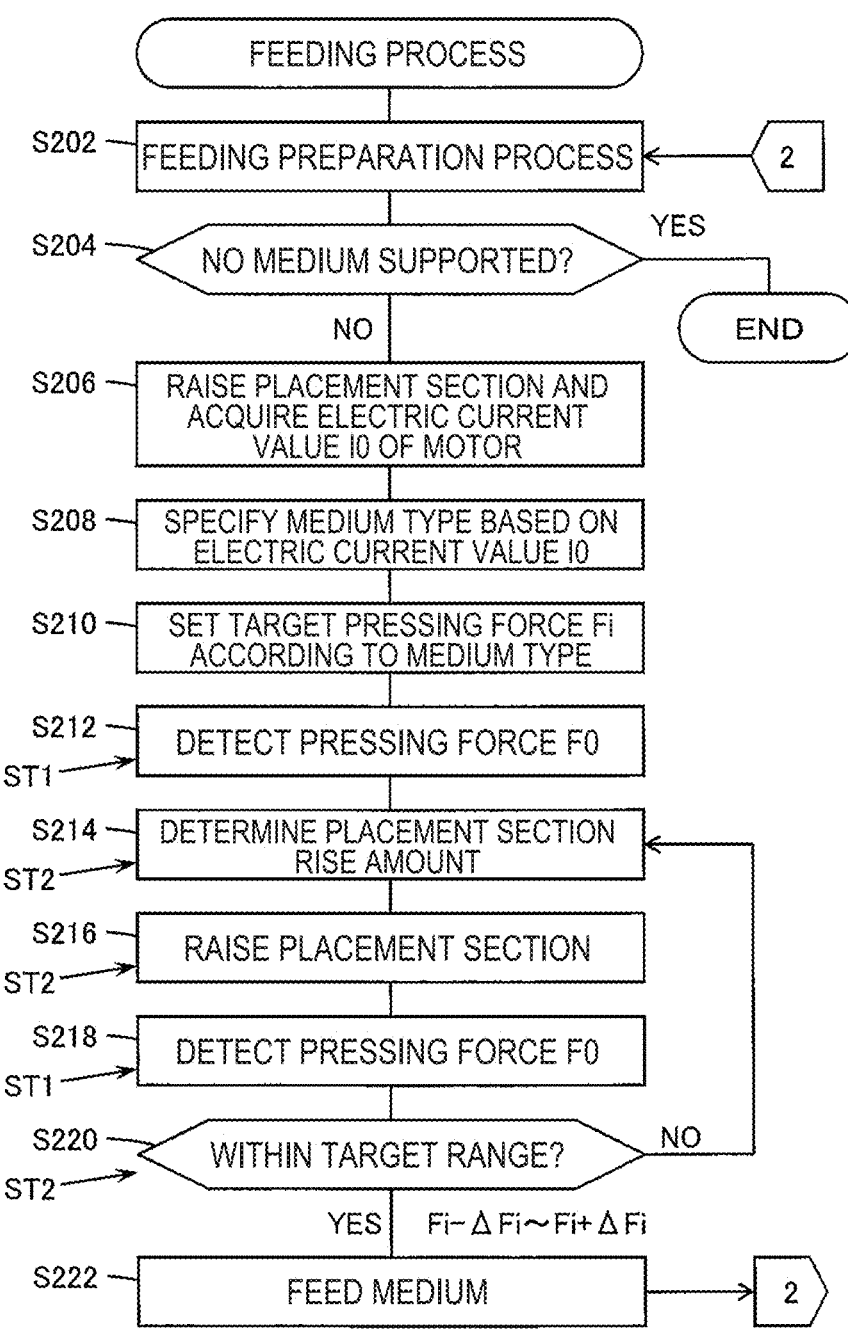

FEEDING PROCESS

S202 — FEEDING PREPARATION PROCESS ◄── ⬠2

S204 — NO MEDIUM SUPPORTED? ── YES ── END

NO

S206 — RAISE PLACEMENT SECTION AND ACQUIRE ELECTRIC CURRENT VALUE I0 OF MOTOR

S208 — SPECIFY MEDIUM TYPE BASED ON ELECTRIC CURRENT VALUE I0

S210 — SET TARGET PRESSING FORCE Fi ACCORDING TO MEDIUM TYPE

S212 / ST1 — DETECT PRESSING FORCE F0

S214 / ST2 — DETERMINE PLACEMENT SECTION RISE AMOUNT

S216 / ST2 — RAISE PLACEMENT SECTION

S218 / ST1 — DETECT PRESSING FORCE F0

S220 / ST2 — WITHIN TARGET RANGE? ── NO

YES   $Fi - \Delta Fi \sim Fi + \Delta Fi$

S222 — FEED MEDIUM ── ⬠2

FIG. 9

UNIT HEIGHT WEIGHT TABLE TA3

| MEDIUM TYPE | $\Delta W$ |
|---|---|
| PLAIN PAPER | $\Delta W1$ |
| THIN PAPER | $\Delta W2$ |
| THICK PAPER | $\Delta W3$ |
| PHOTO PAPER | $\Delta W4$ |

FIG. 10

AFTER SETTING MEDIUM TYPE, START SCAN

COMPARATIVE EXAMPLE

903

MEDIUM FEEDING DEVICE AND CONTROL METHOD FOR MEDIUM FEEDING DEVICE

The present application is based on, and claims priority from JP Application Serial Number 2024-003783, filed Jan. 15, 2024, the disclosure of which is hereby incorporated by reference herein in its entirety.

BACKGROUND

1. Technical Field

The present disclosure relates to a medium feeding device that feeds a medium in a feed direction from a medium group supported on a placement section that is configured to be raised and lowered, and a control method for a medium feeding device.

2. Related Art

As a medium feeding device, JP-A-2011-219256 discloses a sheet feeding device for an image reading device. The sheet feeding device includes a document placement section, a document placement section drive motor for raising and lowering the document placement section, a pickup roller for feeding a document from the document placement section in a feed direction, a document separation feed section including a feed roller and a separation roller, a control section for changing a separation torque of a separation motor, and the like. The control section changes the separation torque according to the deflection rate by utilizing the fact that the deflection rate of a document bundle by the lowering of the pickup roller is different according to the kind of a document.

However, the feeding of the document from the pickup roller to the document separation feed section becomes unstable, and a jam (paper stoppage) may occur in which the document is jammed in the document separation feed section or the like and the feeding operation is stopped.

The above-described problem may occur in devices other than an image reading device, such as a recording device.

SUMMARY

A medium feeding device of the present disclosure includes a placement section on which a medium group is supported; a raising and lowering section configured to raise and lower the placement section; a pickup unit that includes a pickup roller that comes into contact with an upper section of the medium group and a support section that applies a downward force to the pickup roller, the pickup unit feeding the medium in a feed direction in order from a top while applying a downward pressing force to the medium group from the pickup roller; a control section; and a detection section configured to detect the pressing force, wherein the control section causes the raising and lowering section to raise and lower the placement section such that a detected pressing force falls within a target range.

A control method of the present disclosure for a medium feeding device, the medium feeding device including a placement section on which a medium group is supported, a raising and lowering section configured to raise and lower the placement section, and a pickup unit that includes a pickup roller that comes into contact with an upper section of the medium group and a support section that applies a downward force to the pickup roller, the pickup unit feeding the medium in a feed direction in order from a top while applying a downward pressing force to the medium group from the pickup roller, the control method includes a detection step of detecting the pressing force and a raising and lowering control step of causing the raising and lowering section to raise and lower the placement section such that a detected pressing force falls within a target range.

BRIEF DESCRIPTION OF THE DRAWINGS

FIG. 8 is a diagram schematically showing a construction example of a unit sheet number weight table.

FIG. 9 is a flowchart schematically showing an example of a feeding process of automatically determining a medium type.

FIG. 10 is a diagram schematically showing a construction example of a unit height weight table.

DESCRIPTION OF EMBODIMENTS

Hereinafter, embodiments of the present disclosure will be described. Of course, the following embodiments merely exemplify the present disclosure, and all of the features shown in the embodiments are not necessarily essential to the solutions in the present disclosure.

(1) Outline of Aspects Included in Present Disclosure

First, an outline of aspects included in the present disclosure will be described with reference to examples shown in FIGS. 1 to 15. Note that the drawings of the present application are diagrams that schematically show examples, and the enlargement ratios in the respective directions shown in these drawings may be different, and the respective drawings may not match. As a matter of course, each element of the present aspect is not limited to a specific example indicated by a reference symbol. In "Outline of aspects included in present disclosure", the term in parentheses means a supplementary description of the immediately preceding term.

In the present application, the numerical range "Min to Max" means the minimum value Min or more and the maximum value Max or less.

First Aspect

Figure 1:
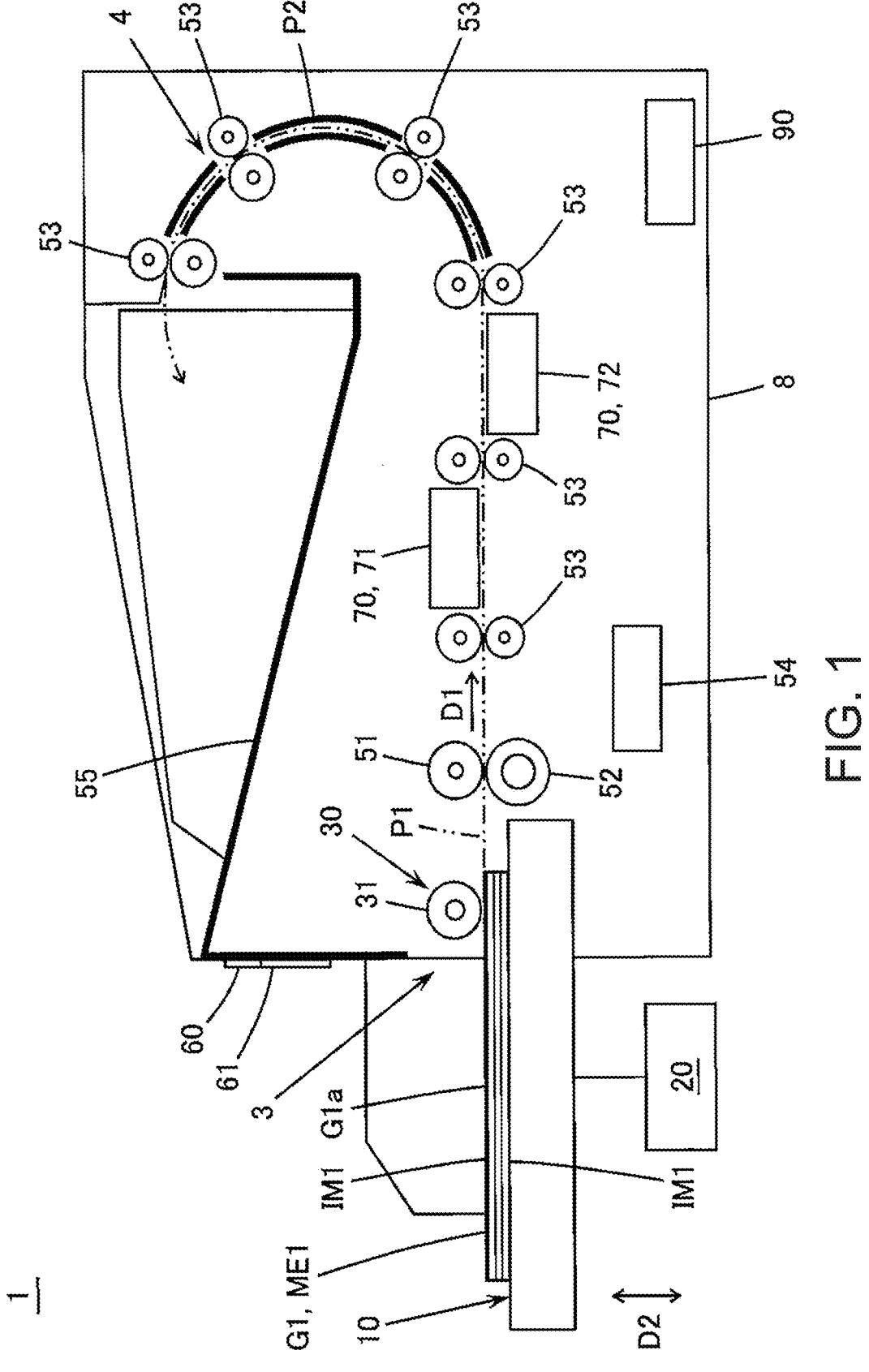
FIG. 1 is a longitudinal cross-sectional view schematically showing an example of an image reading device including a medium feeding device.
Figure 2:
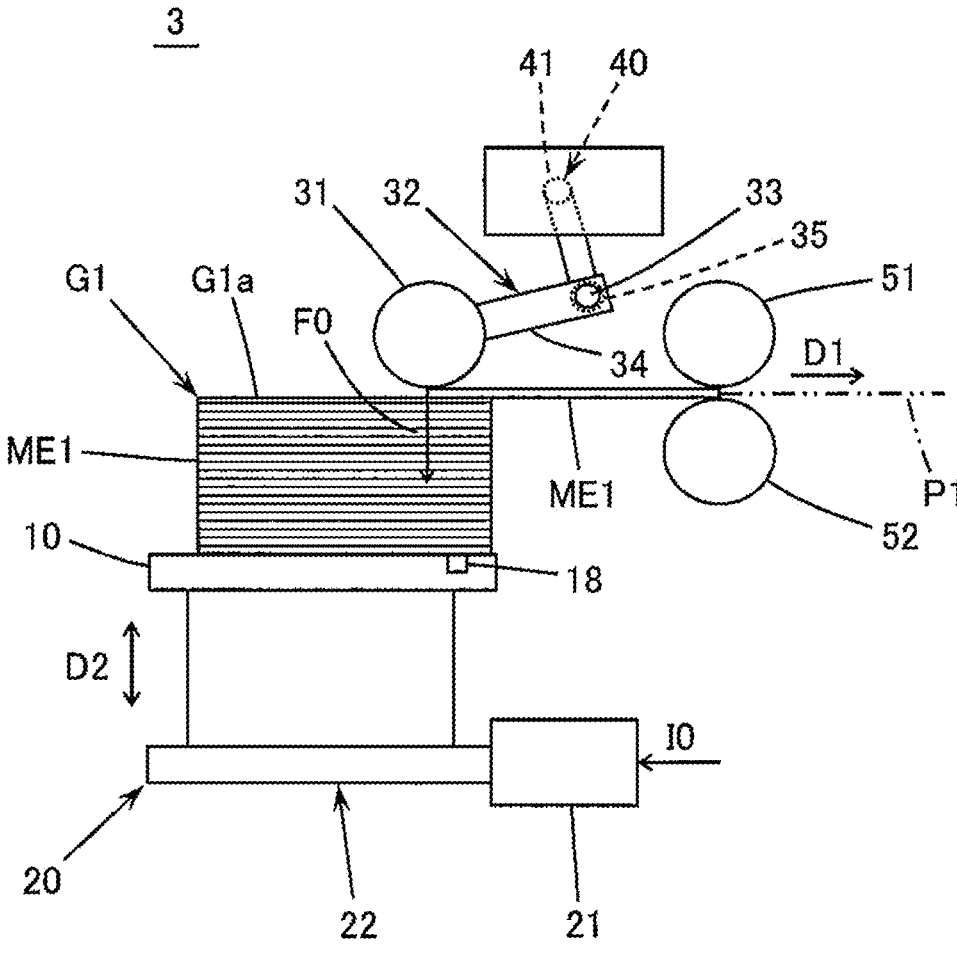
FIG. 2 is a diagram schematically showing an example of the medium feeding device.
Figure 3:
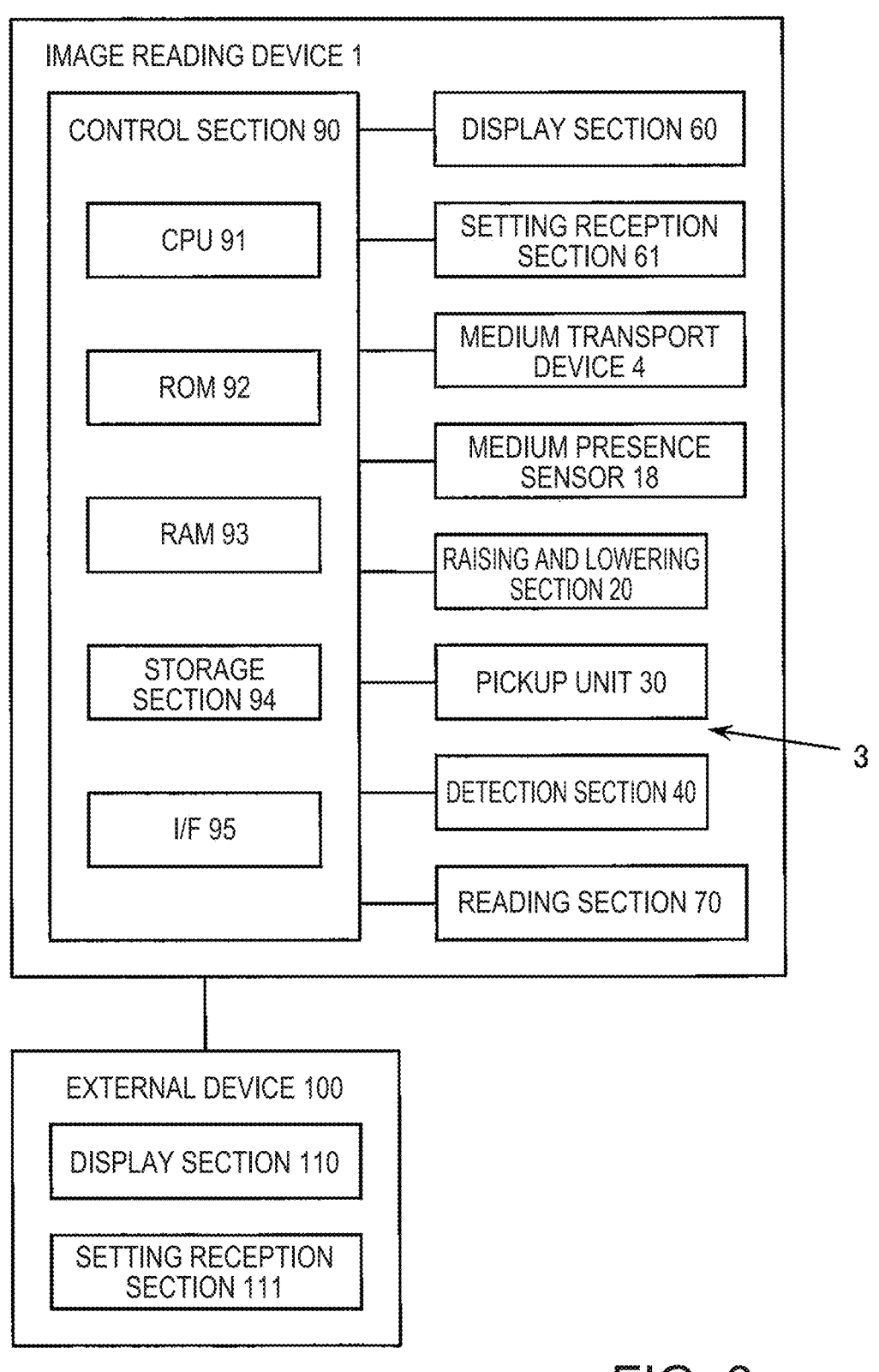
FIG. 3 is a block diagram schematically showing a configuration example of an electrical circuit of the image reading device together with an external device.

As shown in FIGS. 1 to 3 and the like, a medium feeding device 3 according to one aspect includes a placement section 10 on which a medium group G1 is supported, a raising and lowering section 20 that raises and lowers the placement section 10, a pickup unit 30, a control section 90 and a detection section 40. The pickup unit 30 includes a pickup roller 31 that comes into contact with an upper section G1a of the medium group G1, and a support section 32 that applies a downward force to the pickup roller 31, and feeds a medium ME1 in a feed direction D1 in order from the top while applying a downward pressing force F0 from the pickup roller 31 to the medium group G1. The detection section 40 detects the pressing force F0. The control section 90 causes the raising and lowering section 20 to raise and lower the placement section 10 such that a detected pressing force F0 falls within a target range (for example, Ft−ΔFt to Ft+ΔFt).

It was found that the pressing force F0 applied from the pickup roller 31 to the medium group G1 greatly changes when the reason why the feeding of a document from the pickup roller 31 to the document separation feed section becomes unstable was examined.

In the above-described first aspect, the medium ME1 is fed from the placement section 10 in order from the top in a state where the pressing force F0 of the pickup roller 31 is within the target range. Therefore, according to the above-described first aspect, it is possible to provide the medium feeding device capable of improving stability in feeding a medium from the placement section of a medium group. As a result, occurrence of a jam can be suppressed.

The aspect described above include various examples.

The medium feeding device may be provided in an image reading device including a medium reading section, or may be provided in a recording device including a recording section that performs recording on a medium.

Examples of the medium include a document having a document image, a print paper sheet, and the like. The material of the medium is not limited to paper, and may be resin, metal, or the like.

Of course, the above-described additional remarks also apply to the following aspects.

Second Aspect

As shown in FIG. 2, the detection section 40 may include a force sensor 41 using a crystal, and may detect the pressing force F0 by the force sensor 41.

In the above-described case, since the pressing force F0 of the pickup roller 31 can be accurately maintained, the stability of feeding the medium from the placement section can be further improved.

Although not included in the second aspect, the detection section may detect the pressing force by an electrostatic capacitance type force sensor or the like.

Third Aspect

Figure 4:
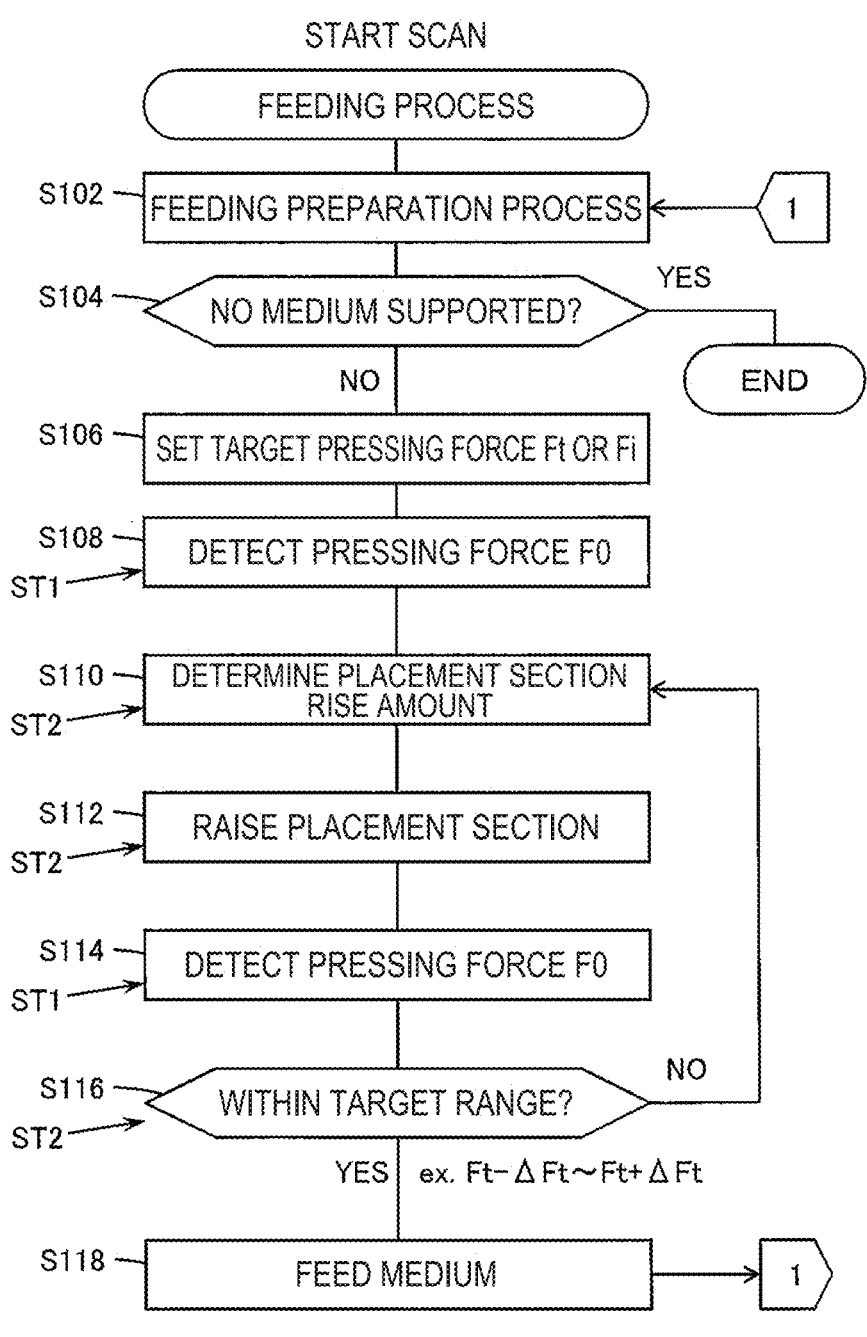
FIG. 4 is a flowchart schematically showing an example of a feeding process.

As shown in FIG. 4, the control section 90 may be capable of receiving a feeding start instruction for the medium ME1. When receiving the feeding start instruction, the control section 90 may cause the raising and lowering section 20 to raise the placement section 10, and when the pressing force F0 detected by the detection section 40 enters the target range (for example, Ft−ΔFt to Ft+ΔFt), the control section 90 may cause the pickup roller 31 to rotate so that the medium ME1 is fed in the feed direction D1.

In the above-described case, since the feeding of the medium ME1 is started after the pressing force F0 of the pickup roller 31 enters the target range, it is possible to improve the stability of feeding a medium from the placement section after the start of the feeding.

Fourth Aspect

Figure 13:
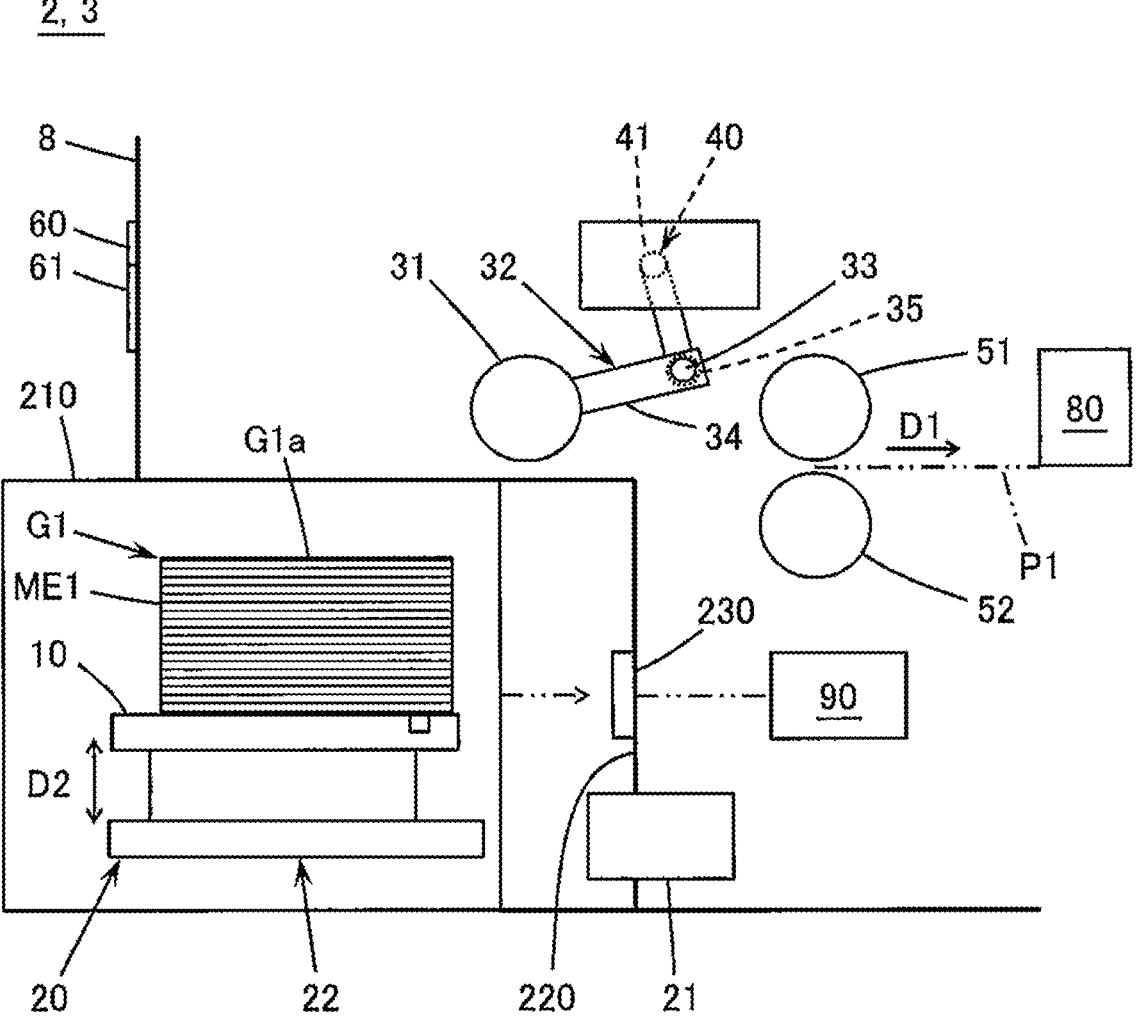
FIG. 13 is a diagram schematically showing an example of a recording device including the medium feeding device.
Figure 14:
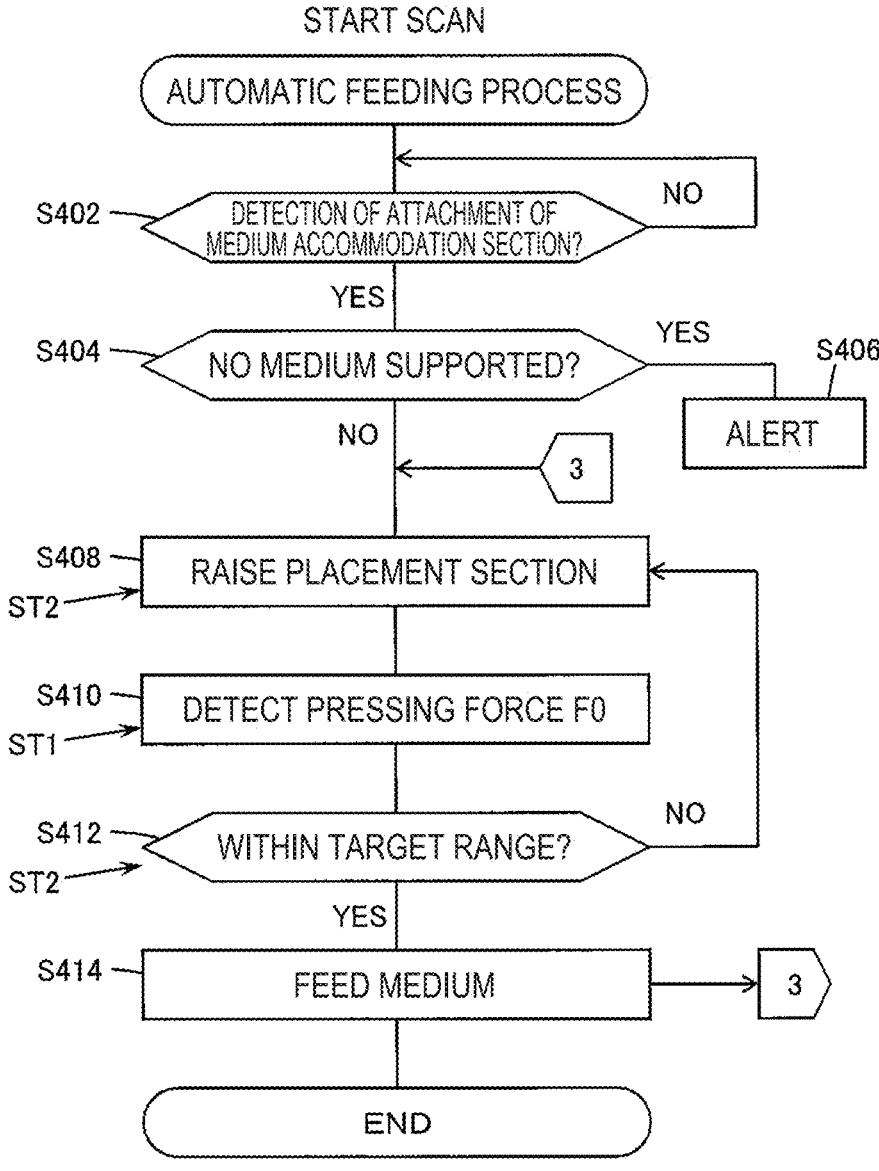
FIG. 14 is a flowchart schematically showing an example of an automatic feeding process.

As shown in FIG. 13, the present medium feeding device 3 may further include a medium accommodation section 210 in which the placement section 10 is arranged, a mount section 220 in which the medium accommodation section 210 can be mounted at a use position, and a mounting detection section 230 that detects whether or not the medium accommodation section 210 is mounted to the mount section 220. As shown in FIG. 14, the control section 90 may cause the raising and lowering section 20 to raise the placement section 10 so that the pressing force F0 detected by the detection section 40 falls within the target range (for example, Ft−ΔFt to Ft+ΔFt) when the mounting detection section 230 detects the mounting of the medium accommodation section 210.

In the above-described case, when the medium accommodation section 210 is mounted to the mount section 220, the pressing force F0 of the pickup roller 31 falls within the target range, thereby improving the stability of feeding a medium from the placement section after the medium accommodation section 210 is mounted.

Fifth Aspect

Figure 5:
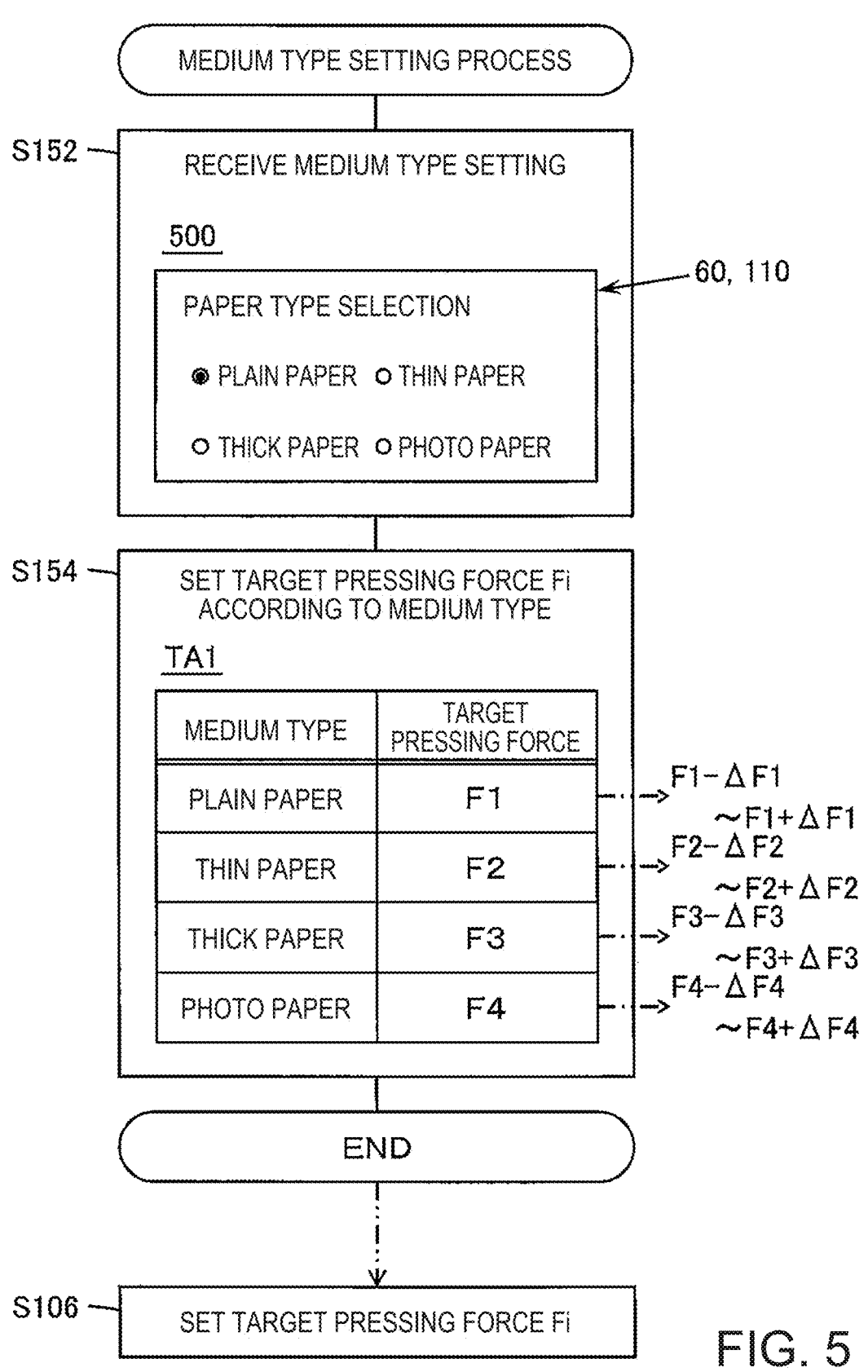
FIG. 5 is a flowchart schematically showing an example of a medium type setting process.

As shown in FIG. 5, the control section 90 may perform a process of specifying a medium type of the medium group G1. The target range may include a first target range (for example, F1−ΔF1 to F1+ΔF1) applied when the medium type is a first medium type, and a second target range (for example, F2−ΔF2 to F2+ΔF2) applied when the medium type is a second medium type different from the first medium type. Here, the second target range is different from the first target range. When the medium type is the first medium type, the control section 90 may cause the raising and lowering section 20 to raise and lower the placement section 10 so that a detected pressing force F0 falls within the first target range (for example, F1−ΔF1 to F1+ΔF1). When the medium type is the second medium type, the control section 90 may cause the raising and lowering section 20 to raise and lower the placement section 10 so that a detected pressing force F0 falls within the second target range (for example, F2−ΔF2 to F2+ΔF2).

In the above-described case, since the medium ME1 is fed from the placement section 10 in order from the top in a state where the pressing force F0 of the pickup roller 31 is within the target range suitable for the medium type, the stability of feeding the medium from the placement section can be improved. As a result, occurrence of jam can be further suppressed.

Here, "first", "second", and the like in the present application are terms for identifying each component included in a plurality of components having a similarity, and do not mean an order. This addition also applies to the following aspects.

Sixth Aspect

As shown in FIG. 5, the target range may include a third target range (for example, F3−ΔF3 to F3+ΔF3) applied when the medium type is a third medium type that is different from the first medium type and the second medium type. Here, it is assumed that the first medium type is a plain paper, the second medium type is a thin paper thinner than the plain paper, and the third medium type is a thick paper thicker than the plain paper. An upper limit value (for example, $F1+\Delta F1$) of the first target range may be larger than an upper limit value (for example, $F2+\Delta F2$) of the second target range, and a lower limit value (for example, $F1-\Delta F1$) of the first target range may be larger than a lower limit value (for example, $F2-\Delta F2$) of the second target range. An upper limit value (for example, $F3+\Delta F3$) of the third target range may be larger than an upper limit value (for example, $F1+\Delta F1$) of the first target range, and a lower limit value (for example, $F3-\Delta F3$) of the third target range may be larger than a lower limit value (for example, $F1-\Delta F1$) of the first target range.

In the above-described case, since the medium ME1 is fed from the placement section 10 in order from the top in a state where the pressing force F0 of the pickup roller 31 falls within the target range suitable for each of the plain paper, the thin paper, and the thick paper, the stability of feeding the medium from the placement section can be improved.

Seventh Aspect

As shown in FIG. 5, the medium feeding device 3 may further include setting reception sections 61 and 111 that receive the setting of the medium type. The control section 90 may cause the raising and lowering section 20 to raise and lower the placement section 10 such that the detected pressing force F0 falls within the target range (for example, $Fi-\Delta Fi$ to $Fi+\Delta Fi$) applied to the medium type set in the setting reception sections 61 and 111.

In the above-described case, since the medium ME1 is fed from the placement section 10 in order from the top in a state where the pressing force F0 of the pickup roller 31 falls within the target range suitable for the set medium type, the stability of feeding the medium from the placement section can be improved.

Eighth Aspect

As shown in FIGS. 6 to 10, the raising and lowering section 20 may include a motor 21 that raises and lowers the placement section 10 when an electric current flows. The control section 90 may acquire an electric current value I0 corresponding to an electric current flowing in the motor 21 when the motor 21 raises the placement section 10 in a state in which the pickup roller 31 is not in contact with the medium group G1. The control section 90 may specify the medium type based on the electric current value I0. The control section 90 may cause the raising and lowering section 20 to raise and lower the placement section 10 such that the detected pressing force F0 falls within the target range (for example, $Fi-\Delta Fi$ to $Fi+\Delta Fi$) applied to the specified medium type.

In the above-described case, since the medium ME1 is fed from the placement section 10 in order from the top in a state where the pressing force F0 of the pickup roller 31 falls within the target range suitable for the specified medium type, the stability of feeding the medium from the placement section can be improved. Since it is possible to save time and effort for a user to set the medium type, it is possible to improve convenience.

Ninth Aspect

Figure 11:
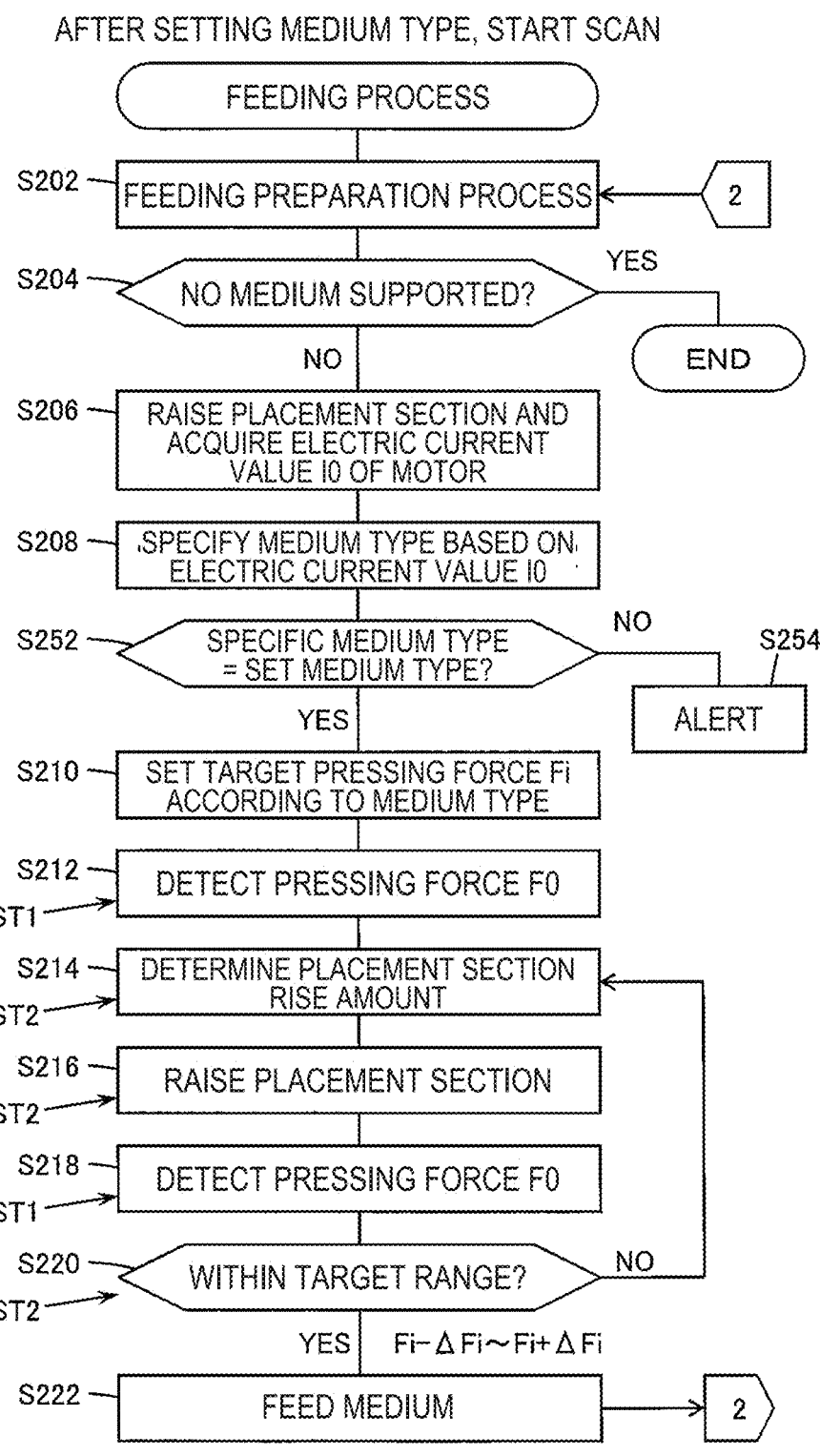
FIG. 11 is a flowchart schematically showing an example of a feeding process of automatically determining a medium type after setting the medium type.

As shown in FIG. 11, when the specified medium type is different from the medium type set in the setting reception sections 61 and 111, the control section 90 may output an alert to display sections 60 and 110.

In the above-described case, since the alert can be confirmed by the display sections 60 and 110 when the automatically specified medium type and the set medium type are different from each other, the error in the setting of the medium type can be easily grasped.

Here, the display section may be provided in the medium feeding device, or may be provided in an external device such as an external computer. This addition also applies to the following aspects.

Tenth Aspect

Figure 12:
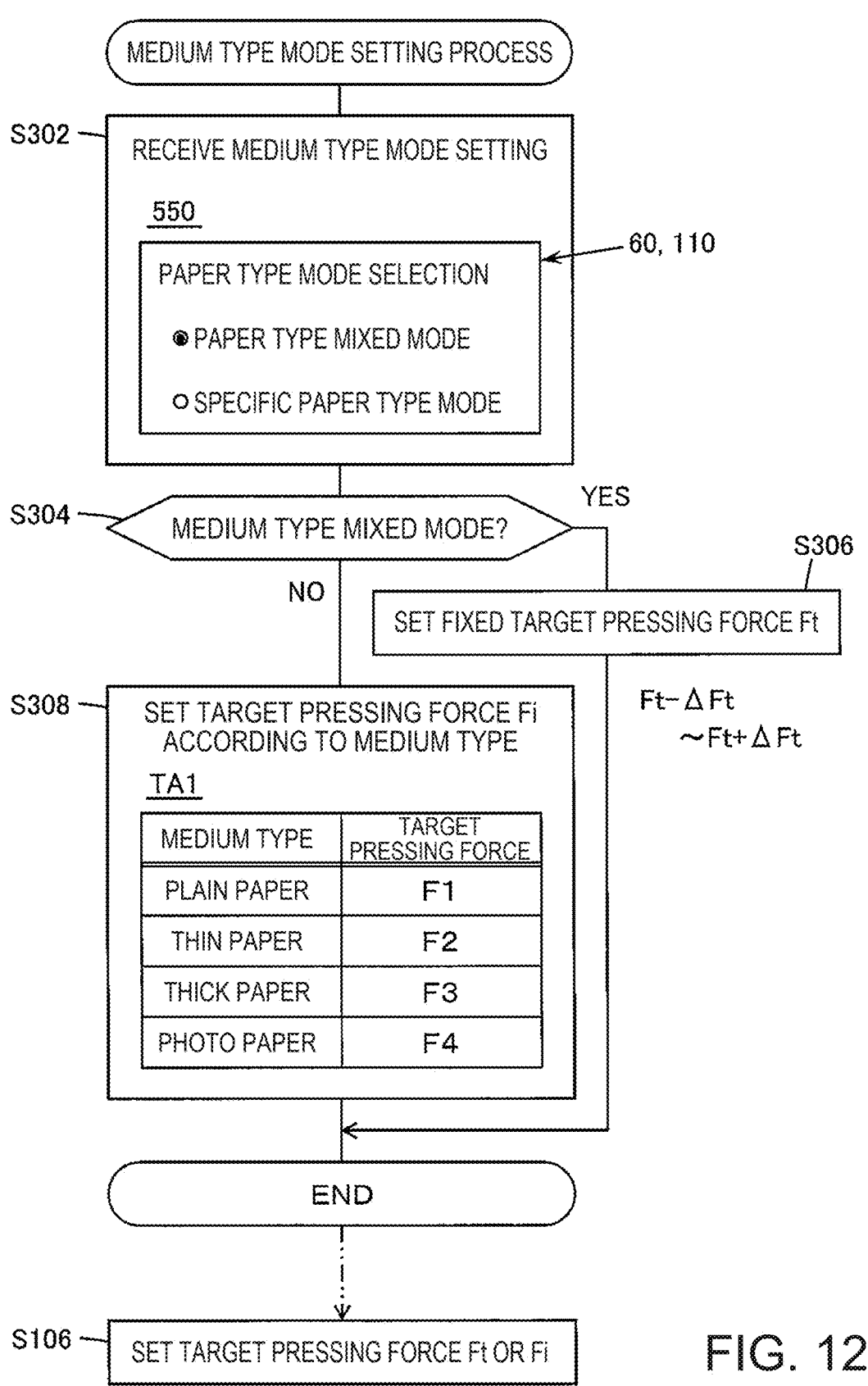
FIG. 12 is a flowchart schematically showing an example of a medium type mode setting process.

As shown in FIG. 12, the medium feeding device 3 may further include setting reception sections 61 and 111 that receive the setting of whether or not the medium group G1 is in a medium type mixed mode in which a plurality of medium types are mixed. The target range may include a fixed target range (for example, $Ft-\Delta Ft$ to $Ft+\Delta Ft$) that is applied when the medium type mixed mode is set, and an individual target range (for example, $Fi-\Delta Fi$ to $Fi+\Delta Fi$) that can change according to the medium type when the medium type mixed mode is not set. When the medium type mixed mode is set, the control section 90 may cause the raising and lowering section 20 to raise and lower the placement section 10 such that the detected pressing force F0 falls within the fixed target range (for example, $Ft-\Delta Ft$ to $Ft+\Delta Ft$). When the medium type mixed mode is not set, the control section 90 may cause the raising and lowering section 20 to raise and lower the placement section 10 such that the detected pressing force F0 falls within the individual target range (for example, $Fi-\Delta Fi$ to $Fi+\Delta Fi$).

In the above-described case, since the medium ME1 is fed from the placement section 10 in order from the top in a state where the pressing force F0 of the pickup roller 31 falls within the target range according to whether or not the mode is the medium type mixed mode, the stability of feeding the medium from the placement section can be improved.

Eleventh Aspect

Incidentally, a control method of the medium feeding device 3 according to one aspect is a control method for the medium feeding device 3 including the placement section 10, the raising and lowering section 20, and the pickup unit 30, and includes the following steps as shown in FIG. 4 and the like.

(a1) A detection step ST1 of detecting the pressing force F0.

(a2) A raising and lowering control step ST2 of causing the raising and lowering section 20 to raise and lower the placement section 10 such that the detected pressing force F0 falls within a target range (for example, $Ft-\Delta Ft$ to $Ft+\Delta Ft$).

The above-described aspect can provide a control method for a medium feeding device capable of improving the stability in feeding a medium from a placement section of a medium group. As a result, occurrence of a jam can be suppressed.

Furthermore, the above-described aspects can be applied to a medium transport device including the above-described medium feeding device, an image reading device including the above-described medium feeding device, a recording device including the above-described medium feeding device, a medium feeding system including the above-described medium feeding device, a control method of the medium transport device described above, a control method of the image reading device described above, a control method of the recording device described above, a control program of the above-described medium feeding device, a control program of the medium transport device described above, a control program of the image reading device described above, a control program of the recording device described above, and a computer-readable non-transitory medium in which any of the control programs described above is recorded. Any of the devices described above may be comprised of multiple parts that are distributed.

(2) Specific Example of Image Reading Device Including Medium Feeding Device FIG. 1 is a longitudinal cross-sectional view schematically showing an image reading device 1 including a medium feeding device 3. FIG. 2 schematically shows the medium feeding device 3. FIG. 3 is a block diagram schematically showing a configuration example of an electric circuit of the image reading device 1 together with an external device 100.

The image reading device 1 includes a medium feeding device 3, a medium transport device 4, a reading section 70, and the like, and reads an image IM1 of a medium ME1 as a document. The reading section 70 shown in FIG. 1 includes a first reading section 71 capable of reading the image IM1 on an upper surface of the medium ME1 and a second reading section 72 capable of reading the image IM1 on a lower surface of the medium ME1. The medium feeding device 3 includes a placement section 10 of a medium group G1, a raising and lowering section 20 of the placement section 10, a pickup unit 30, a detection section 40 of a pressing force F0 from a pickup roller 31 to the medium group G1, a display section 60, a setting reception section 61, and a control section 90. The medium transport device 4, the reading section 70, and the control section 90 are provided inside a housing 8 of the image reading device 1. The reference symbol D1 indicates a feed direction of the medium ME1, and the reference symbol D2 indicates a raising and lowering direction of the placement section 10.

The placement section 10 is also referred to as an elevator and can be raised and lowered. The medium group G1 is supported on the placement section 10. The medium group G1 means one or more sheets of the medium ME1 in a medium bundle in which a plurality of sheets of the medium ME1 are stacked. The placement section 10 shown in FIG. 2 is provided with a medium presence sensor 18 that can detect whether or not the medium group G1 is supported.

The raising and lowering section 20 shown in FIG. 2 includes a motor 21 and a raising and lowering mechanism 22, and raises and lowers the placement section 10. The motor 21 raises and lowers the placement section 10 via the raising and lowering mechanism 22 when an electric current flows. As the motor 21, a servo motor including a servo amplifier capable of detecting an electric current value I0 corresponding to an electric current flowing through the motor 21 can be used. As the raising and lowering mechanism 22, a mechanism using a ball screw or the like can be used.

The pickup unit 30 shown in FIG. 2 includes the pickup roller 31 in contact with an upper section G1a of the medium group G1, and a support section 32 that applies a downward force to the pickup roller 31. The pickup roller 31 is rotatable in a direction of feeding the medium ME1 in the feed direction D1 by a drive source (not shown) such as a servo motor. The control section 90 causes the drive source to rotate the pickup roller 31 by a predetermined amount when the medium ME1 is to be fed. The support section 32 includes an arm 34 that supports the rotatable pickup roller 31 that is pivotable about a shaft 33 as a fulcrum, and a spring 35 that applies a force to the arm 34 in a direction to apply a downward force to the pickup roller 31. The pickup unit 30 including the pickup roller 31 and the support section 32, in accordance with control from the control section 90, applies the downward pressing force F0 from the pickup roller 31 to the medium group G1 while feeding the medium ME1 in the feed direction D1 in order from the top.

The detection section 40 shown in FIG. 2 includes a force sensor 41 using a crystal, and detects the pressing force F0 by the force sensor 41. The detection section 40 may be a electrostatic capacitance type force sensor, but the force sensor 41 using crystal can detect the pressing force F0 with higher resolution than the electrostatic capacitance type force sensor. As the detection section 40, a force sensor that detects force in a linear direction may be used, or a torque sensor that detects torque, which is the moment of a rotating force, may be used. As the force sensor, a six axes force sensor having three force axes and three moment axes, a three axes force sensor having three force axes, a single axis force sensor having a single force axis, or the like can be used. When a force sensor or a six axes force sensor is used, the force acting on the pickup roller 31 can be detected, and when a torque sensor or a six axes force sensor is used, the moment acting on the pickup roller 31 can be detected.

The medium transport device 4 transports sheets of the medium ME1 one by one from the pickup unit 30 to the stacker 55 via the reading section 70 of the medium ME1. The medium transport device 4 shown in FIG. 1 includes a feed roller 51, a separation roller 52, a plurality of transport roller pairs 53, and a drive source 54. The feed roller 51 rotates above a transport path P1 in a direction to feed the medium ME1 in the feed direction D1, and the separation roller 52 rotates below the transport path P1 in a direction to return the medium ME1 in the opposite direction to the feed direction D1. When a plurality of sheets of medium ME1 are fed between the feed roller 51 and the separation roller 52, the sheets of medium ME1 are separated one by one and fed in the feed direction D1 by the feed roller 51. The plurality of transport roller pairs 53 are positioned along the transport path P1, which includes a curved inversion path P2, and transport the medium ME1 along the transport path P1. The drive source 54 rotates the feed roller 51, the separation roller 52, and the plurality of transport roller pairs 53 under the control of the control section 90.

As described above, the medium transport device 4 transports sheets of the medium ME1 one by one from the pickup unit 30 to the stacker 55 via the first reading section 71 and the second reading section 72 along the transport path P1. Since the transport path P1 includes the curved inversion path P2, the medium ME1 transported by the medium transport device 4 is inverted and stacked on the stacker 55.

The display section 60 displays information such as the status of the image reading device 1 and information input from the setting reception section 61. Examples of the status of the image reading device 1 include a state in which an image reading process can be executed, a state in which an image is being read, and an alert state. Examples of the display section 60 include a liquid crystal display panel, a light emitting diode, a combination thereof, and the like. The setting reception section 61 receives an operation of inputting information such as a medium type or a mode from a user. For example, the setting reception section 61 receives a setting of a medium type, and receives a setting of whether or not the mode is a medium type mixed mode in which a plurality of medium types are mixed in the medium group G1. Examples of the setting reception section 61 include hard keys, a touch screen attached to the display section 60, and the like.

The control section 90 shown in FIG. 3 includes a central processing unit (CPU) 91 that is a processor, a read only memory (ROM) 92, a random access memory (RAM) 93, a storage section 94, an interface (I/F) 95, and the like. The above-described elements (91 to 95) are electrically connected so as to be able to input and output information to and from each other. The ROM 92 and the RAM 93 are semiconductor memories. Examples of the storage section 94 include a nonvolatile semiconductor memory such as a flash memory, a magnetic storage device such as a hard disk, and the like. The control section 90 can acquire input information from the setting reception section 61, can acquire information indicating the presence or absence of the medium group G1 from the medium presence sensor 18, can acquire the pressing force F0 from the detection section 40, and can acquire read data of the image IM1 of the medium ME1 from the reading section 70. The control section 90 can cause the display section 60 to display various kinds of information including an alert, controls the raising and lowering section 20 that raises and lowers the placement section 10, controls the pickup unit 30 that rotates the pickup roller 31, and controls the medium transport device 4 for image reading process.

The control section 90 may include a plurality of CPUs, or may include an application specific integrated circuit (ASIC) instead of a CPU or together with a CPU. Therefore, a process performed by the control section 90 may be divided into a plurality of CPUs, or may be performed by an ASIC instead of or together with a CPU.

The external device 100 includes a display section 110, a setting reception section 111, and the like, and is connected to the image reading device 1. Examples of the external device 100 include a personal computer, a tablet device, a mobile phone such as a smartphone, and the like.

Figure 15:
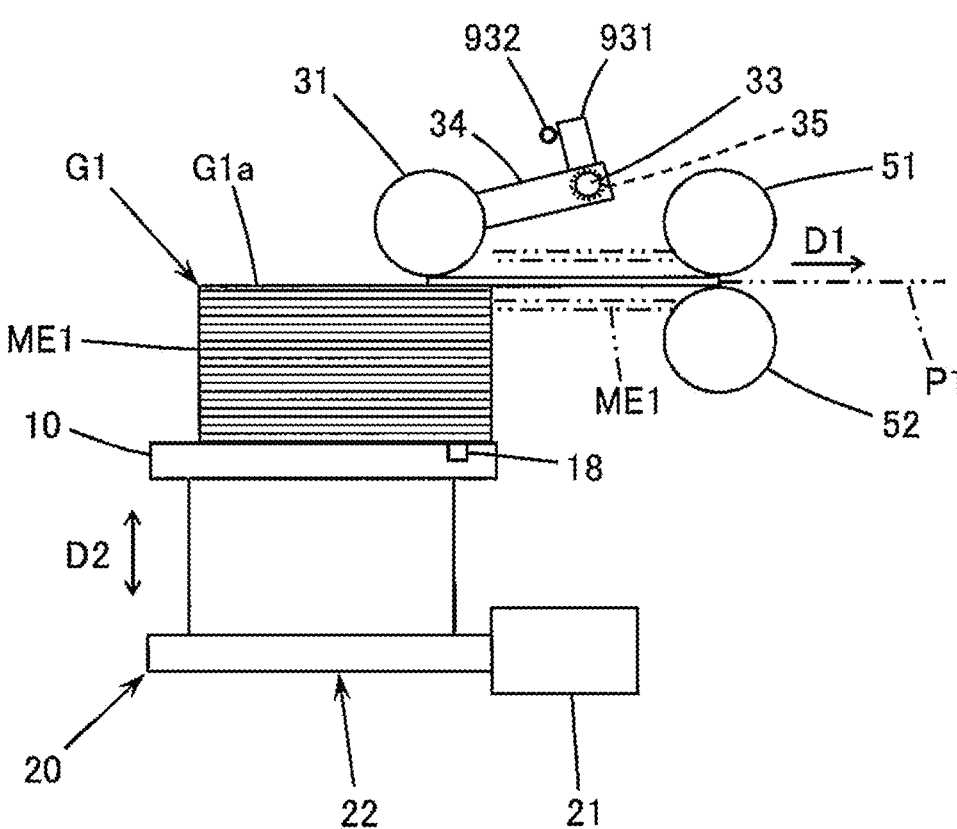
FIG. 15 is a diagram schematically showing a medium feeding device according to a comparative example.

Here, a medium feeding device 903 of a comparative example shown in FIG. 15 will be described. Among the elements of the medium feeding device 903 shown in FIG. 15, the same elements as those of the medium feeding device 3 shown in FIG. 2 are denoted by the same reference symbols as those shown in FIG. 2, and a detailed description thereof will be omitted.

The medium feeding device 903 includes the placement section 10 of the medium group G1, the raising and lowering section 20 of the placement section 10, the pickup unit 30, a control section (not shown), and the like, but does not include the detection section 40 of the pressing force F0. The pickup roller 31 feeds sheets of the medium ME1 from the medium group G1 one by one in the feed direction D1. The pickup roller 31 is lowered every time the medium ME1 is fed, so that the pickup roller 31 can come into contact with the next medium ME1. The pickup roller 31 can pass the medium ME1 to the feed roller 51 and the separation roller 52 one after another by repeating driving and stopping at an appropriate timing. When the feeding of the medium ME1 is repeated, the pickup roller 31 will be too low to feed the medium ME1. Then, a sensor dog 931 of the pickup unit 30 blocks a sensor optical axis 932 as a trigger, and the raising and lowering section 20 raises the placement section 10 by a predetermined amount. Alternatively, the raising and lowering section 20 raises the placement section 10 by a certain amount each time one sheet of the medium ME1 is fed.

In either case, the posture of the pickup unit 30 cannot be maintained at an optimal angle when the medium ME1 is fed. Therefore, as shown by the two dot chain line in FIG. 15, the fed medium ME1 fluctuates up and down, or the pressing force from the pickup roller 31 to the medium group G1 fluctuates, which leads to the occurrence of a jam.

In the present specific example, the detection section 40 detects the downward pressing force F0 applied to the medium group G1 from the pickup roller 31, and the control section 90 controls the raising and lowering section 20 to raise and lower the placement section 10 such that the detected pressing force F0 falls within a target range. By this, the stability of feeding the medium ME1 from the placement section 10 of the medium group G1 is improved, and occurrence of a jam is suppressed.

For example, by using a force sensor for detecting the pressing force F0, the control section 90 can perform control in which the moment around the fulcrum of the pickup unit 30 is detected by the force sensor and fed back even when the medium group G1 being continuously fed gradually decreases. The control section 90 controls the raising of the placement section 10 such that the moment generated around the fulcrum of the pickup unit 30 is always substantially constant, and thus the angle of the pickup unit 30 and the pressing force F0 received by the pickup roller 31 from the medium group G1 can always be maintained substantially constant. As the force sensor, various sensors described above can be used. There is a force sensor for a robot that detects six senses (Fx, Fy, Fz, Mx, My, Mz), but if one of the six senses can be detected, the pressing force F0 can be kept almost constant.

(3) Specific Example of Process Performed by Image Reading Device Including Medium Feeding Device FIG. 4 schematically shows a feeding process performed by the control section 90. In an initial state, it is assumed that the placement section 10 is at a lower position at which the pickup roller 31 does not contact the medium group G1. The feeding process starts when the control section 90 receives a feeding start instruction for the medium ME1. The feeding start instruction may be an instruction caused by a pressing operation on a scan start button included in the setting reception section 61 of the image reading device 1, an instruction caused by a predetermined scan start operation on the setting reception section 111 of the external device 100, or the like. The control section 90 starts the feeding process when receiving the feeding start instruction caused by the pressing operation on the scan start button from the setting reception section 61 or the feeding start instruction caused by the scan start operation from the setting reception section 111. Here, steps S108 and S114 correspond to a detection step ST1, and steps S110 to S112 and S116 correspond to a raising and lowering control step ST2. Hereinafter, the description of "step" may be omitted, and reference symbols of steps may be indicated in parentheses.

When the feeding process starts, the control section 90 performs a predetermined feeding preparation process such as acquiring information from the medium presence sensor 18 (S102), and judges whether or not the medium group G1 is supported on the placement section 10 based on information from the medium presence sensor 18 (S104). In a case where information from the medium presence sensor 18 indicates that there is no medium group G1, that is, in a case where the medium group G1 is not supported on the placement section 10, the control section 90 ends the feeding process.

When information from the medium presence sensor 18 indicates the presence of the medium group G1, that is, when the medium group G1 is supported on the placement section 10, the control section 90 sets a target pressing force Ft or Fi, which is the target pressing force F0 for stopping the raising and lowering of the placement section 10 (S106). Here, the target pressing force Ft is a fixed pressing force that does not depend on the medium type and the target pressing force Fi is a pressing force that can change depending on a medium type.

After setting the target pressing force, the control section 90 causes the detection section 40 to detect the pressing force F0, and obtains the pressing force F0 from the detection section 40 (S108). Next, the control section 90 determines a rise amount of the placement section 10 according to the setting (S110). For example, the image reading device 1 may store the placement section rise amount corresponding to the setting of the target pressing force Ft or Fi in the storage section 94. In this case, the control section 90 may acquire the placement section rise amount corresponding to the setting of the target pressing force Ft or Fi from the storage section 94.

Then, the control section 90 causes the raising and lowering section 20 to raise the placement section 10 by the determined rise amount (S112). In addition, the control section 90 causes the detection section 40 to detect the pressing force F0, and acquires the pressing force F0 from the detection section 40 (S114). Next, the control section 90 judges whether or not the pressing force F0 is within a target range (S116).

The target range of the pressing force F0 is set to a range including the target pressing force Ft or Fi. For example, a fixed target range that does not depend on a medium type can be set to Ft−ΔFt to Ft+ΔFt in consideration of the difference of a permissible amount ΔFt (ΔFt>0) with the target pressing force Ft (Ft>0) as the center. In this case, if the detected pressing force F0 is equal to or larger than Ft−ΔFt and equal to or smaller than Ft+ΔFt, it is determined that the pressing force F0 is within a target range.

When the pressing force F0 is not within the target range in S116, the control section 90 repeats the processes of S110 to S116. When the pressing force F0 is within the target range in S116, the control section 90 controls the pickup unit 30 to feed one sheet of the medium ME1 from the medium group G1 to the feed direction D1 by the rotation of the pickup roller 31 (S118), and returns the process to S102.

As described above, when the control section 90 receives the feeding start instruction for the medium ME1, the control section 90 causes the raising and lowering section 20 to raise the placement section 10, and when the pressing force F0 detected by the detection section 40 enters the target range (for example, Ft−ΔFt to Ft+ΔFt), the control section 90 rotates the pickup roller 31 so that the medium ME1 is fed in the feed direction D1. In other words, the control section 90 causes the raising and lowering section 20 to raise and lower the placement section 10 such that the detected pressing force F0 falls within the target range (for example, Ft−ΔFt to Ft+ΔFt). The pickup unit 30 feeds, from the pickup roller 31, the medium ME1 in the feed direction D1 in order from the top while applying the pressing force F0 within a target range to the medium group G1. By this, the medium ME1 is fed from the placement section 10 in order from the top in a state where the pressing force F0 of the pickup roller 31 is within the target range. Therefore, the present specific example can improve the stability of feeding the medium ME1 from the placement section 10 of the medium group G1, can suppress the occurrence of jam, and can suppress the occurrence of waste paper.

Incidentally, the control section 90 may perform a medium type setting process shown in FIG. 5. In this case, the control section 90 may set the target pressing force Fi corresponding to the set medium type. In FIG. 5, a medium type setting screen 500 displayed on the display sections 60 and 110, and a target pressing force table TA1 stored in the storage section 94 or the external device 100 are also shown.

The medium type setting process starts, for example, when the setting reception section 61 of the image reading device 1 receives a predetermined operation for setting the medium type of the feed target. The medium type setting process starts when the control section 90 receives a medium type setting request from the external device 100 due to the fact that the setting reception section 111 receives a predetermined operation for setting the medium type of the feed target.

When the medium type setting process starts, the control section 90 displays the medium type setting screen 500 on at least one of the display sections 60 and 110, and receives the setting of the medium type by the setting reception section 61 or 111 (S152). The medium type setting screen 500 includes a selection region for a medium type such as plain paper, thin paper, thick paper, or photo paper. The setting reception section 61 or 111 receives a selection operation of any one medium type from the plurality of selection regions from a user. Therefore, the control section 90 can acquire information indicating the medium type corresponding to the operated selection region from the setting reception section 61 or the external device 100.

It can be said that the medium type setting process in S152 is a process of specifying the medium type of the medium group G1.

Thereafter, the control section 90 sets the target pressing force Fi associated with the set medium type in accordance with the target pressing force table TA1 (S154). The target pressing force table TA1 stores a target pressing force F1 for plain paper as a first medium type, a target pressing force F2 for thin paper as a second medium type, a target pressing force F3 for thick paper as a third medium type, a target pressing force F4 for photo paper as a fourth medium type, and the like. The target pressing forces F1 to F4 are set, for example, to be 0<F2<F1<F3<F4. Here, the permissible amounts centered on the target pressing forces F1, F2, F3, and F4 are denoted as ΔF1, ΔF2, ΔF3, and ΔF4, respectively. A first target range applied when the medium type is plain paper can be F1−ΔF1 to F1+ΔF1. A second target range applied when the medium type is thin paper can be F2−ΔF2 to F2+ΔF2. The lower limit value (F2−ΔF2) of the second target range is smaller than the lower limit value (F1−ΔF1) of the first target range, and the upper limit value (F2+ΔF2) of the second target range is smaller than the upper limit value (F1+ΔF1) of the first target range. A third target range applied when the medium type is thick paper can be F3−ΔF3 to F3+ΔF3. The lower limit value (F3−ΔF3) of the third target range is larger than the lower limit value (F1−ΔF1) of the first target range, and the upper limit value (F3+ΔF3) of the third target range is larger than the upper limit value (F1+ΔF1) of the first target range. A fourth target range applied when the medium type is photo paper may be F4−ΔF4 to F4+ΔF4.

When the medium type setting process ends, the control section 90 sets the target pressing force Fi according to the set medium type in the target pressing force setting process S106 shown in FIG. 4. In the example shown in FIG. 5, the target pressing force F1 is set when plain paper is set, the target pressing force F2 is set when thin paper is set, the target pressing force F3 is set when thick paper is set, and the target pressing force F4 is set when photo paper is set. In a judgment process of S116 shown in FIG. 4, when the pressing force F0 is equal to or larger than (Fi−ΔFi) and equal to or less than (Fi+ΔFi), the control section 90 assumes that the pressing force F0 is within the target range and performs the medium feeding process of S118.

As described above, in a case where the medium type is plain paper, the control section 90 causes the raising and lowering section 20 to raise and lower the placement section 10 such that the detected pressing force F0 falls within the first target range (F1−ΔF1 to F1+ΔF1). In a case where the medium type is thin paper, the control section 90 causes the raising and lowering section 20 to raise and lower the placement section 10 such that the detected pressing force F0 falls within the second target range (F2−ΔF2 to F2+ΔF2). In a case where the medium type is thick paper, the control section 90 causes the raising and lowering section 20 to raise and lower the placement section 10 such that the detected pressing force F0 falls within the third target range (F3−ΔF3 to F3+ΔF3). In a case where the medium type is photo paper, the control section 90 causes the raising and lowering section 20 to raise and lower the placement section 10 such that the detected pressing force F0 falls within the fourth target range (F4−ΔF4 to F4+ΔF4).

As a result, the medium ME1 is fed from the placement section 10 in order from the top in a state in which the pressing force F0 of the pickup roller 31 falls within the target range suitable for the set medium type. Therefore, in the present specific example, the stability of feeding the medium ME1 from the placement section 10 of the medium group G1 can be further improved, and the occurrence of jam can be further suppressed.

In a case where a mechanism that physically switches the posture of the pickup unit in order to set a separation mode specialized for a specific medium type is provided in the medium feeding device, the number of separation modes that can be provided is limited to two or three. By the raising and lowering control of the placement section 10 based on the pressing force F0 detected by the detection section 40, a physical posture switching mechanism becomes unnecessary, and the number of separation forces corresponding to paper sheets can be set to as many as necessary. By this, in a case where a user designates the medium type before reading the document group, the target pressing force Fi corresponding to the medium type is automatically set, and it is not necessary to manually switch the posture of the pickup unit. Since there is no mechanism for switching the posture of the pickup unit, the number of parts is reduced, which leads to cost reduction.

Figure 6:
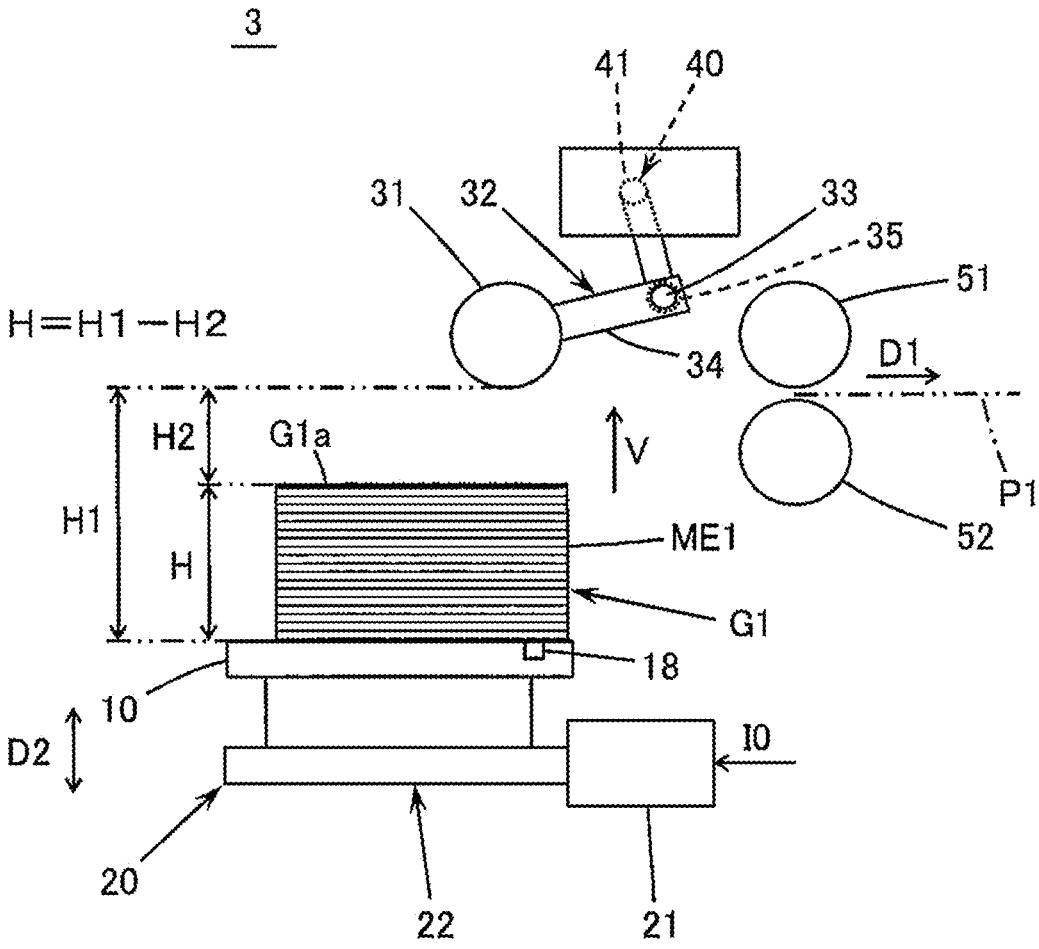
FIG. 6 is a diagram schematically showing an example of the medium feeding device when a motor raises a placement section.
Figure 7:
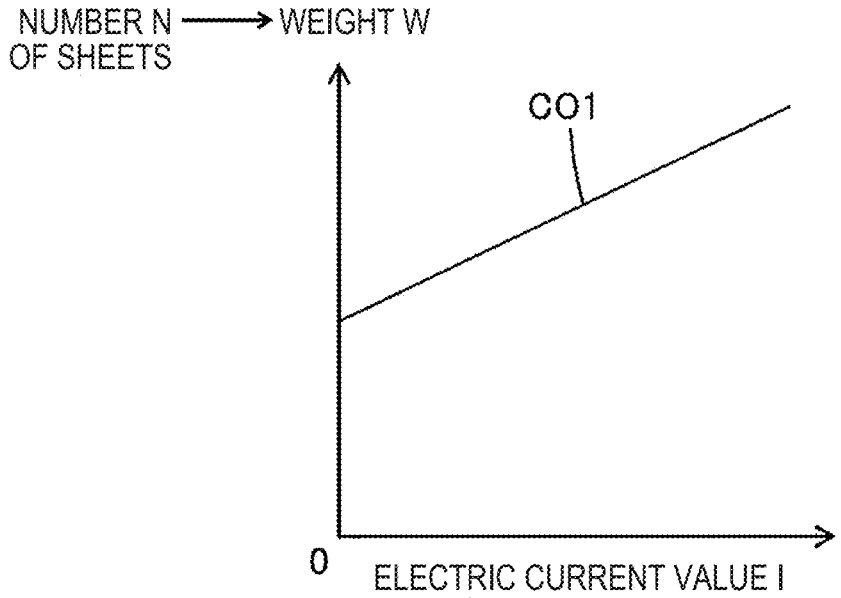
FIG. 7 is a diagram schematically showing an example of the correspondence relationship between an electric current value I of the motor and a weight W of a medium group.

As shown in FIGS. 6 to 9, the control section 90 may specify the medium type based on the electric current value I0 of the motor 21 and set the target pressing force Fi according to the specified medium type. FIG. 6 schematically shows the medium feeding device 3 when the motor 21 raises the placement section 10. FIG. 6 shows the medium feeding device 3 in a state where the placement section 10 is lowered to the lowest position. FIG. 7 schematically shows a correspondence relationship CO1 between an electric current value I (A) corresponding to the electric current flowing in the motor 21 and the weight W (g) of the medium group G1 supported on the placement section 10. In FIG. 7, the horizontal axis represents the electric current value I and the vertical axis represents the weight W. FIG. 8 schematically shows the structure of a unit sheet number weight table TA2 stored in the storage section 94 or the external device 100. FIG. 9 schematically shows a feeding process in which the medium type is automatically determined when the number N of sheets of medium ME1 included in the medium group G1 is known.

As shown in FIG. 6, when the motor 21 raises the placement section 10 at a constant speed V in a state where the pickup roller 31 is not in contact with the medium group G1, the larger the combined weight of the placement section 10 and the medium group G1, the larger the electric current flowing to the motor 21. Therefore, as shown in FIG. 7, the correspondence relationship CO1 between the electric current value I of the motor 21 and the weight W of the medium group G1 is such that the weight W increases as the electric current value I increases. Therefore, in order to obtain the weight W of the medium group G1 supported on the placement section 10, the correspondence relationship CO1 may be obtained in advance. If the electric current value I of the motor 21 is known, the weight W of the medium group G1 supported on the placement section 10 is obtained in accordance with the correspondence relationship CO1. The weight W of the medium group G1 is proportional to the number N of sheets of the medium ME1. In a case where the medium group G1 includes N sheets of the medium ME1, the weight ΔW per one sheet of the medium is W/N.

In the unit sheet number weight table TA2 shown in FIG. 8, the weight ΔW1 of plain paper, the weight ΔW2 of thin paper, the weight ΔW3 of thick paper, the weight ΔW4 of photo paper, and the like are stored as the weight ΔW per one sheet of the medium. These weights ΔW can be determined by actually measuring the weight of the medium ME1.

The control section 90 performs the feeding process according to the flowchart shown in FIG. 9. In an initial state, it is assumed that the placement section 10 is at a lower position at which the pickup roller 31 does not contact the medium group G1. The feeding process shown in FIG. 9 starts when the control section 90 receives the feeding start instruction for the medium ME1 after the number N of sheets of the medium group G1 is set. The number N of sheets may be set by an operation of the number N of sheets on the setting reception section 61 of the image reading device 1, or may be set by an operation of the number N of sheets on the setting reception section 111 of the external device 100. The control section 90 acquires the number N of sheets from the setting reception section 61 or the external device 100, and starts the feeding process upon receiving the feeding start instruction. Here, S212 and S218 correspond to the detection step ST1, and S214 to S216 and S220 correspond to the raising and lowering control step ST2.

When the feeding process starts, the control section 90 performs the same feeding preparation process as S102 shown in FIG. 4 (S202), and judges whether or not the medium group G1 is supported on the placement section 10, in the same manner as S104 shown in FIG. 4 (S204). When the medium group G1 is supported on the placement section 10, the control section 90 causes the raising and lowering section 20 to raise the placement section 10 in a state in which the pickup roller 31 is not in contact with the medium group G1, and acquires the electric current value I0 of the motor 21 from the raising and lowering section 20 (S206). The raising and lowering section 20 detects the electric current value I0 corresponding to the electric current flowing through the motor 21 when the motor 21 raises the placement section 10. Therefore, the control section 90 can acquire the electric current value I0 from the raising and lowering section 20.

Next, the control section 90 specifies the medium type based on the electric current value I0 (S208). The control section 90 can obtain the weight W of the medium group G1 supported on the placement section 10 from the electric current value I0 in accordance with the correspondence relationship CO1 in FIG. 7, and can calculate the weight ΔW=W/N per one sheet of the medium. In addition, the control section 90 may specify the medium type associated with the weight closest to the calculated weight ΔW=W/N among the weights ΔW1 to ΔW4 per one sheet of the medium stored in the unit sheet number weight table TA2 shown in FIG. 8.

Next, the control section 90 sets the target pressing force Fi according to the specified medium type (S210). In the example shown in FIG. 5, the target pressing force F1 is set when plain paper is set, the target pressing force F2 is set when thin paper is set, the target pressing force F3 is set when thick paper is set, and the target pressing force F4 is set when photo paper is set.

Next, the control section 90 causes the detection section 40 to detect the pressing force F0, acquires the pressing force F0 from the detection section 40 (S212), determines the rise amount of the placement section 10 according to the setting (S214), and causes the raising and lowering section 20 to raise the placement section 10 by the determined rise amount (S216). Then, the control section 90 causes the detection section 40 to detect the pressing force F0, acquires the pressing force F0 from the detection section 40 (S218), and judges whether or not the pressing force F0 is within the target range (S220).

The target range of the pressing force F0 is set to a range including the target pressing force Fi. An individual target range that can change according to the medium type can be set to $Fi-\Delta Fi$ to $Fi+\Delta Fi$ in consideration of the difference of the permissible amount $\Delta Fi$ ($\Delta Fi>0$) with the target pressing force Fi ($Fi>0$) as the center. In this case, if the detected pressing force F0 is equal to or larger than $Fi-\Delta Fi$ and equal to or smaller than $Fi+\Delta Fi$, it is determined that the pressing force F0 is within a target range. When the pressing force F0 is not within the target range in S220, the control section 90 repeats the processes of S214 to S220. When the pressing force F0 is within the target range in S220, the control section 90 controls the pickup unit 30 to feed one sheet of the medium ME1 from the medium group G1 to the feed direction D1 by the rotation of the pickup roller 31 (S222), and returns the process to S202.

As described above, when the pressing force F0 detected by the detection section 40 enters the target range ($Fi-\Delta Fi$ to $Fi+\Delta Fi$), the control section 90 rotates the pickup roller 31 such that the medium ME1 is fed in the feed direction D1. In other words, the control section 90 causes the raising and lowering section 20 to raise and lower the placement section 10 such that the detected pressing force F0 falls within the target range ($Fi-\Delta Fi$ to $Fi+\Delta Fi$). The pickup unit 30 feeds, from the pickup roller 31, the medium ME1 in the feed direction D1 in order from the top while applying the pressing force F0 within a target range to the medium group G1. By this, the medium ME1 is fed from the placement section 10 in order from the top in a state in which the pressing force F0 of the pickup roller 31 falls within the target range suitable for the specified medium type. Therefore, in the present specific example, the stability of feeding the medium ME1 from the placement section 10 of the medium group G1 can be further improved, and the occurrence of jam can be further suppressed.

Furthermore, as shown in FIG. 10, even if the number N of sheets of the medium ME1 included in the medium group G1 is unknown, the control section 90 can specify the medium type based on the electric current value I0 of the motor 21. FIG. 10 schematically shows the structure of a unit height weight table TA3 stored in the storage section 94 or the external device 100. Hereinafter, description will be made with reference to FIGS. 6, 7, 9, and the like.

As shown in FIG. 6, the height of the medium group G1 is defined as H, the height from the lowest placement section 10 to the pickup roller 31 is defined as a maximum rise amount H1, and the height from the upper section G1a of the medium group G1 supported on the lowest placement section 10 to the pickup roller 31 is defined as an actual rise amount H2. The height H of the medium group G1 is $H1-H2$. The actual rise amount H2 is obtained by calculating the difference between the position of the lowest placement section 10 in the raising and lowering direction D2 and the position of the placement section 10 in the raising and lowering direction D2 at the time when the detection section 40 detects that the medium group G1 has come into contact with the pickup roller 31 due to the raising of the placement section 10. As described above, when the electric current value I of the motor 21 is known, the weight W of the medium group G1 supported on the placement section 10 is obtained according to the correspondence relationship CO1 in FIG. 7. Here, the weight per unit height of the medium group G1 is $\Delta W$. The weight $\Delta W$ per unit height is W/H.

The unit height weight table TA3 shown in FIG. 10 stores, as the weight $\Delta W$ per unit height, the weight $\Delta W1$ of plain paper, the weight $\Delta W2$ of thin paper, the weight $\Delta W3$ of thick paper, the weight $\Delta W4$ of photo paper, and the like. These weights $\Delta W$ can be determined by actually measuring the height and weight of the medium group G1.

Next, the feeding process performed by the control section 90 will be described with reference to FIG. 9. In an initial state, it is assumed that the placement section 10 is at a lower position at which the pickup roller 31 does not contact the medium group G1. However, the number N of sheets of the medium group G1 is not set, and the control section 90 starts the feeding process using the reception of the feeding start instruction as a trigger.

When the feeding process starts, the control section 90 performs the feeding preparation process (S202) and judges whether or not the medium group G1 is supported on the placement section 10 (S204). When the medium group G1 is supported on the placement section 10, the control section 90 causes the raising and lowering section 20 to raise the placement section 10 in a state in which the pickup roller 31 is not in contact with the medium group G1, and acquires the electric current value I0 of the motor 21 from the raising and lowering section 20 (S206).

Next, the control section 90 causes the raising and lowering section 20 to raise the placement section 10 until the medium group G1 contacts the pickup roller 31, acquires the actual rise amount H2 from the raising and lowering section 20, calculates the height $H=H1-H2$ of the medium group G1, and specifies the medium type based on the electric current value I0 (S208). The control section 90 can obtain the weight W of the medium group G1 supported on the placement section 10 from the electric current value I0 in accordance with the correspondence relationship CO1 in FIG. 7, and can calculate the weight $\Delta W=W/H$ per unit height of the medium group G1. Then, the control section 90 may specify the medium type associated with the weight closest to the calculated weight $\Delta W=W/H$ among the weights $\Delta W1$ to $\Delta W4$ per unit height stored in the unit height weight table TA3 shown in FIG. 10.

Next, the control section 90 sets the target pressing force Fi according to the specified medium type (S210). Next, the control section 90 causes the detection section 40 to detect the pressing force F0, acquires the pressing force F0 from the detection section 40 (S212), determines the rise amount of the placement section 10 according to the setting (S214), and causes the raising and lowering section 20 to raise the placement section 10 by the determined rise amount (S216). Then, the control section 90 causes the detection section 40 to detect the pressing force F0, acquires the pressing force F0 from the detection section 40 (S218), and judges whether or not the pressing force F0 is within the target range (S220). When the pressing force F0 is not within the target range in S220, the control section 90 repeats the processes of S214 to S220. When the pressing force F0 is within the target range in S220, the control section 90 controls the pickup unit 30 to feed one sheet of the medium ME1 from the medium group G1 to the feed direction D1 by the rotation of the pickup roller 31 (S222), and returns the process to S202.

In this manner, the control section 90 causes the raising and lowering section 20 to raise and lower the placement section 10 such that the detected pressing force F0 falls within the target range (Fi−ΔFi to Fi+ΔFi). The pickup unit 30 feeds, from the pickup roller 31, the medium ME1 in the feed direction D1 in order from the top while applying the pressing force F0 within a target range to the medium group G1. By this, the medium ME1 is fed from the placement section 10 in order from the top in a state in which the pressing force F0 of the pickup roller 31 falls within the target range suitable for the specified medium type. Therefore, in the present specific example, the stability of feeding the medium ME1 from the placement section 10 of the medium group G1 can be further improved, and the occurrence of jam can be further suppressed.

Further, as shown in FIG. 11, in a case where the specified medium type is different from the medium type set in the setting reception sections 61 and 111, the control section 90 may output an alert to the display sections 60 and 110. FIG. 11 schematically shows a feeding process for automatically determining a medium type after setting the medium type. In the feeding process shown in FIGS. 11, S252 and S254 are added between S208 and S210 as compared with the feeding process shown in FIG. 9. The feeding process shown in FIG. 11 starts when the control section 90 receives the feeding start instruction for the medium ME1 after the medium type setting process shown in FIG. 5 is performed.

When the medium type is specified by the process from S202 to S208, the control section 90 judges whether or not the specified medium type matches the medium type set by the setting reception section 61 or 111 (S252). In a case where the specified medium type and the set medium type match each other, the control section 90 performs the process of S210 and the subsequent processes. If the specified medium type is different from the set medium type, the control section 90 outputs an alert to at least one of the display sections 60 and 110 (S254). Examples of the alert include text information such as "The detected paper type is different from the setting.", lighting of the display section such as red lighting of a light emitting diode, blinking of the display section such as blinking of a light emitting diode, and the like. For example, when the set medium type is plain paper and the specified medium type is thin paper, the alert may be more specific information such as "Thin paper has been detected. It is different from plain paper of the setting."

As described above, in the example shown in FIG. 11, in a case where the automatically specified medium type and the set medium type are different from each other, the alert can be confirmed on the display sections 60 and 110. Therefore, a user can easily recognize an error in the setting of the medium type, and can suppress the occurrence of waste paper due to the occurrence of an unintended jam.

Further, the control section 90 may perform a medium type mode setting process shown in FIG. 12. FIG. 12 also shows a medium type mode setting screen 550 displayed on the display sections 60 and 110, and the target pressing force table TA1 stored in the storage section 94 or the external device 100.

The medium type mode setting process starts, for example, when the setting reception section 61 of the image reading device 1 receives a predetermined operation for setting a medium type mode of the medium group G1. The medium type mode setting process starts when the control section 90 receives a medium type mode setting request from the external device 100 because the setting reception section 111 receives a predetermine operation for setting the medium type mode of the medium group G1.

When the medium type mode setting process starts, the control section 90 displays the medium type mode setting screen 550 on at least one of the display sections 60 and 110, and receives the setting of the medium type mode by the setting reception section 61 or 111 (S302). The medium type mode setting screen 550 includes a selection region of "paper type mixed mode" indicating a medium type mixed mode and a selection region of "specific paper type mode" indicating a specific medium type mode. The setting reception section 61 or 111 receives a selection operation of one of these selection regions from a user. It can be said that the setting reception section 61 or 111 receives the setting of whether or not the medium group G1 is in the medium type mixed mode in which a plurality of medium types are mixed. The control section 90 can acquire information indicating the medium type mode corresponding to the operated selection region from the setting reception section 61 or the external device 100.

Then, the control section 90 judges whether or not the set medium type mode is the medium type mixed mode (S304). When the set medium type mode is the medium type mixed mode, the type of each medium ME1 of the feed target is not specified. Therefore, the control section 90 sets the target pressing force to a fixed target pressing force Ft that does not depend on the medium type (S306). If the set medium type mode is the specific medium type mode, the control section 90 specifies the medium type of the medium group G1 as shown in FIGS. 5, 9 and the like, and sets the individual target pressing force Fi according to the medium type in accordance with the target pressing force table TA1 (S308).

When the medium type setting process ends, the control section 90 sets the target pressing force Fi according to the set medium type mode in the target pressing force setting process S106 shown in FIG. 4. The fixed target pressing force Ft is set when the medium type mixed mode is set and the individual target pressing force Fi is set when the specific medium type mode is set. When the medium type mixed mode is set, the control section 90 judges whether or not the pressing force F0 is within the fixed target range (Ft−ΔFt to Ft+ΔFt) in S116 shown in FIG. 4. As a result, when the medium type mixed mode is set, the control section 90 causes the raising and lowering section 20 to raise and lower the placement section 10 such that the detected pressing force F0 falls within the fixed target range (Ft−ΔFt to Ft+ΔFt). When the specific medium type mode is set, the control section 90 judges whether or not the pressing force F0 is within the individual target range (Fi−ΔFi to Fi+ΔFi) in S116 shown in FIG. 4. As a result, when the medium type mixed mode is not set, the control section 90 causes the raising and lowering section 20 to raise and lower the placement section 10 such that the detected pressing force F0 falls within the individual target range (Fi−ΔFi to Fi+ΔFi).

As described above, the medium ME1 is fed from the placement section 10 in order from the top in a state in which the pressing force F0 of the pickup roller 31 is within the target range corresponding to whether or not the medium type mixed mode is set. Therefore, in the example shown in FIG. 12, it is possible to improve the stability of feeding the medium ME1 from the placement section 10 depending on whether or not a plurality of medium types are mixed in the medium group G1, and it is possible to suppress the occurrence of jam.

(4) Modifications

The present disclosure includes various modifications.

For example, the support section 32 of the pickup unit 30 is not limited to a pivot type that uses the shaft 33 and the arm 34, and may be a slide type that uses a slider movable in the vertical direction.

As shown in FIG. 13, the medium feeding device 3 may be provided in a recording device 2. FIG. 13 schematically shows a recording device 2 including the medium feeding device 3. Among the elements of the recording device 2 shown in FIG. 13, the same elements as those of the medium feeding device 3 shown in FIG. 2 are denoted by the same reference symbols as those shown in FIG. 2, and a detailed description thereof will be omitted.

The recording device 2 includes the medium feeding device 3, a medium transport device (not shown), a recording section 80, and the like, and performs recording on a medium ME1 of the record target. Examples of the recording device 2 include an inkjet printer, an electrophotographic printer, and the like. The recording device 2 may be a printer single device, a copy device, a facsimile, a multifunction device having a plurality of functions including a printing function, or the like. The recording section 80 performs recording on the medium ME1, such as performing printing on the medium ME1. The medium feeding device 3 includes the placement section 10 of the medium group G1, a raising and lowering section 20 of the placement section 10, the pickup unit 30, the detection section 40 of the pressing force F0 from the pickup roller 31 to the medium group G1, the display section 60, the setting reception section 61, the control section 90, a medium accommodation section 210, a mount section 220, and a mounting detection section 230. The medium transport device 4 transports sheets of the medium ME1 one by one from the pickup unit 30 to a stacker via the recording section 80. The control section 90 can execute the processes shown in FIGS. 4, 5, 9, 11, and 12.

The recording device 2 shown in FIG. 13 is provided with a detachable medium accommodation section 210 as a cassette. A placement section 10 that can be raised and lowered is arranged inside the medium accommodation section 210. In the mount section 220, the medium accommodation section 210 can be mounted at a use position. Use position means a position of the medium accommodation section 210 in a case of being inserted to the innermost portion of the mount section 220. The mounting detection section 230 detects whether or not the medium accommodation section 210 is mounted on the mount section 220.

The control section 90 performs an automatic feeding process according to the flowchart shown in FIG. 14. In an initial state, it is assumed that the medium accommodation section 210 is pulled out from the mount section 220, and the placement section 10 is at a lower position such that the pickup roller 31 does not contact the medium group G1. The automatic feeding process starts when the control section 90 receives a feeding start instruction for the medium ME1.

When the automatic feeding process starts, the control section 90 judges whether or not the mounting detection section 230 detects that the medium accommodation section 210 is mounted on the mount section 220 (S402). The process of S402 is repeated until the medium accommodation section 210 is mounted on the mount section 220. When the medium accommodation section 210 is mounted on the mount section 220, the control section 90 judges whether or not the medium group G1 is supported on the placement section 10 (S404). When the medium group G1 is not supported on the placement section 10, the control section 90 outputs an alert to at least one of the display sections 60 and 110 (S406). Examples of the alert include text information such as "Paper is not set in the cassette.", lighting of a display section such as red lighting of a light emitting diode, blinking of a display section such as blinking of a light emitting diode, and the like.

When the medium group G1 is supported on the placement section 10, the control section 90 causes the raising and lowering section 20 to raise the placement section 10 (S408), causes the detection section 40 to detect the pressing force F0, and acquires the pressing force F0 from the detection section 40 (S410). Then, the control section 90 judges whether or not the pressing force F0 is within the target range (S412). If the pressing force F0 is not within the target range, the control section 90 repeats the process of S408 to S412. When the pressing force F0 is within the target range, the control section 90 controls the pickup unit 30 to feed one sheet of the medium ME1 from the medium group G1 in the feed direction D1 by the rotation of the pickup roller 31 (S414), and returns the process to S408 until the recording is completed.

As described above, when the mounting of the medium accommodation section 210 is detected by the mounting detection section 230, the control section 90 causes the raising and lowering section 20 to raise the placement section 10 such that the pressing force F0 detected by the detection section 40 enters the target range. The pickup unit 30 feeds, from the pickup roller 31, the medium ME1 in the feed direction D1 in order from the top while applying the pressing force F0 within a target range to the medium group G1. By this, the medium ME1 is fed from the placement section 10 in order from the top in a state where the pressing force F0 of the pickup roller 31 is within the target range. Since the pressing force F0 of the pickup roller 31 falls within the target range when the medium accommodation section 210 is mounted on the mount section 220, the example shown in FIGS. 13 and 14 can improve the stability of feeding the medium ME1 from the placement section 10 after the medium accommodation section 210 is mounted, and can suppress the occurrence of jam.

(5) Conclusion

As described above, according to various aspects of the present disclosure, it is possible to provide a configuration or the like capable of improving stability in feeding the medium from the placement section of the medium group. As a matter of course, the above-described basic operations and effects can be obtained even in an aspect including only the constituent features according to the independent claims.

In addition, it is possible to implement a configuration in which each configuration disclosed in the above-described examples is replaced with each other or a combination thereof is changed, a configuration in which each configuration disclosed in a known art and the above-described examples is replaced with each other or a combination thereof is changed, and the like. The present disclosure includes these configurations and the like.

What is claimed is:

1. A medium feeding device comprising:
   a placement section on which a medium group in which a plurality of sheets of a medium are stacked is supported;

a raising and lowering section configured to raise and lower the placement section;

a pickup roller that comes into contact with an upper section of the medium group;

a support section that applies a downward force to the pickup roller;

a control section; and a detection section configured to detect the pressing force, wherein the control section causes the raising and lowering section to raise and lower the placement section such that a detected pressing force falls within a target range, and feeds an uppermost medium of the medium group in a feed direction while applying a downward pressing force to the medium group from the pickup roller.

2. The medium feeding device according to claim 1, wherein the detection section includes a force sensor using a crystal and detects the pressing force by the force sensor.

3. The medium feeding device according to claim 1, wherein the control section is configured to receive a feeding start instruction for the medium and, when the feeding start instruction is received, the control section causes the raising and lowering section to raise the placement section and, when the pressing force detected by the detection section enters the target range, the control section causes the pickup roller to rotate so that the medium is fed in the feed direction.

4. The medium feeding device according to claim 1, further comprising:

a medium accommodation section in which the placement section is arranged;

a mount section configured so that the medium accommodation section is mountable thereto at a use position; and a mounting detection section that detects whether or not the medium accommodation section is mounted to the mount section, wherein when mounting of the medium accommodation section is detected by the mounting detection section, the control section causes the raising and lowering section to raise the placement section such that the pressing force detected by the detection section enters the target range.

5. The medium feeding device according to claim 1, wherein the control section performs a process of specifying a medium type of the medium group, the target range includes a first target range applied in a case where the medium type is a first medium type and a second target range applied in a case where the medium type is a second medium type different from the first medium type, the second target range is different from the first target range, and in a case where the medium type is the first medium type, the control section causes the raising and lowering section to raise and lower the placement section such that a detected pressing force falls within the first target range and, in a case where the medium type is the second medium type, the control section causes the raising and lowering section to raise and lower the placement section such that a detected pressing force falls within the second target range.

6. The medium feeding device according to claim 5, wherein the target range includes a third target range applied in a case where the medium type is a third medium type different from the first medium type and from the second medium type, the first medium type is plain paper, the second medium type is thin paper that is thinner than the plain paper, and the third medium type is thick paper that is thicker than the plain paper, and an upper limit value of the first target range is larger than an upper limit value of the second target range, a lower limit value of the first target range is larger than a lower limit value of the second target range, an upper limit value of the third target range is larger than an upper limit value of the first target range, and a lower limit value of the third target range is larger than a lower limit value of the first target range.

7. The medium feeding device according to claim 5, further comprising:

a setting reception section that receives a setting of the medium type, wherein the control section causes the raising and lowering section to raise and lower the placement section such that a detected pressing force falls within the target range applied to the medium type set by the setting reception section.

8. The medium feeding device according to claim 5, wherein the raising and lowering section includes a motor that raises and lowers the placement section when an electric current flows and the control section acquires an electric current value corresponding to an electric current flowing in the motor when the motor raises the placement section in a state in which the pickup roller is not in contact with the medium group, specifies the medium type based on the electric current value, and causes the raising and lowering section to raise and lower the placement section such that a detected pressing force falls within the target range applied to a specified medium type.

9. The medium feeding device according to claim 8, further comprising:

a setting reception section that receives a setting of the medium type, wherein when the specified medium type is different from a medium type set in the setting reception section, the control section outputs an alert to a display section.

10. The medium feeding device according to claim 1, further comprising:

a setting reception section that receives a setting of whether or not the setting is a medium type mixed mode in which a plurality of medium types are mixed in the medium group, wherein the target range includes a fixed target range that is applied in a case where the medium type mixed mode is set and an individual target range that changes according to the medium type in a case where the medium type mixed mode is not set and when the medium type mixed mode is set, the control section causes the raising and lowering section to raise and lower the placement section such that a detected pressing force falls within the fixed target range and, when the medium type mixed mode is not set, the control section causes the raising and lowering section to raise and lower the placement section such that a detected pressing force falls within the individual target range.

11. A control method for a medium feeding device, the medium feeding device including a placement section on which a medium group in which a plurality of sheets of a medium are stacked is supported, a raising and lowering section configured to raise and lower the placement section, and a pickup roller that comes into contact with an upper section of the medium group, the control method comprising:

a detection step of detecting the pressing force;

a raising and lowering control step of causing the raising and lowering section to raise and lower the placement section such that a detected pressing force falls within a target range; and a feeding step of feeding an uppermost medium of the medium group in a feed direction while applying a downward pressing force to the medium group from the pickup roller.

\* \* \* \* \*